(12) United States Patent
Hu et al.

(10) Patent No.: US 12,608,374 B2
(45) Date of Patent: Apr. 21, 2026

(54) DATA SEARCH METHOD AND APPARATUS, AND NETWORK DEVICE

(71) Applicant: Huawei Technologies Co., Ltd., Shenzhen (CN)

(72) Inventors: Jing Hu, Beijing (CN); Yang Liu, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 18/764,809

(22) Filed: Jul. 5, 2024

(65) Prior Publication Data

US 2024/0362216 A1 Oct. 31, 2024

Related U.S. Application Data

(63) Continuation of application No. PCT/CN2022/140472, filed on Dec. 20, 2022.

(30) Foreign Application Priority Data

Jan. 7, 2022 (CN) .......................... 202210024548.4
Mar. 16, 2022 (CN) .......................... 202210257749.9

(51) Int. Cl.
*G06F 16/2453* (2019.01)
*G06F 16/22* (2019.01)
*G06F 16/2455* (2019.01)

(52) U.S. Cl.
CPC .... *G06F 16/24532* (2019.01); *G06F 16/2282* (2019.01); *G06F 16/24552* (2019.01)

(58) Field of Classification Search
CPC .... G06F 16/22; G06F 16/24552; G06F 16/27; G06F 16/24532; G06F 16/2282
USPC .......................................................... 707/718
See application file for complete search history.

(56) References Cited

U.S. PATENT DOCUMENTS

| | | | |
|---|---|---|---|
| 9,442,846 B2 | 9/2016 | Iyer et al. | |
| 2013/0060815 A1* | 3/2013 | Saeki ...................... | G06F 16/27 707/802 |
| 2013/0097284 A1* | 4/2013 | Bai ........................ | H04L 9/3273 709/217 |
| 2016/0246506 A1 | 8/2016 | Hebig et al. | |

FOREIGN PATENT DOCUMENTS

CN 107766478 A 3/2018

* cited by examiner

*Primary Examiner* — Hung T Vy
(74) *Attorney, Agent, or Firm* — Conley Rose, P.C.

(57) ABSTRACT

A data search apparatus includes a plurality of storage modules configured to store a data table. Any one of the plurality of storage modules stores a part of entries of the data table. Any entry in the data table is unique in the plurality of storage modules, and storage addresses of entries stored in at least one of the plurality of storage modules are inconsecutive.

27 Claims, 9 Drawing Sheets

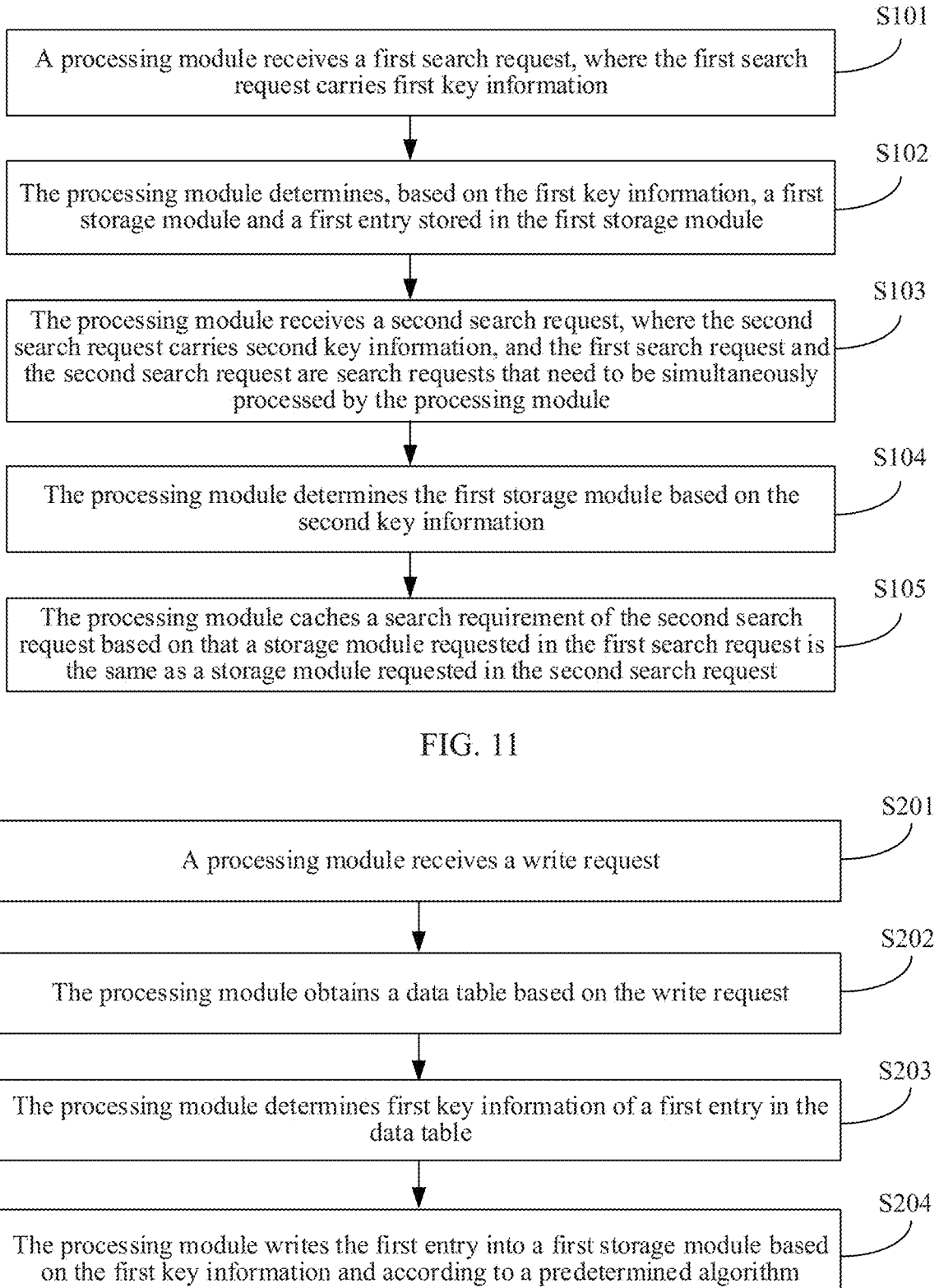

S101

A processing module receives a first search request, where the first search request carries first key information

S102

The processing module determines, based on the first key information, a first storage module and a first entry stored in the first storage module

S103

The processing module receives a second search request, where the second search request carries second key information, and the first search request and the second search request are search requests that need to be simultaneously processed by the processing module

S104

The processing module determines the first storage module based on the second key information

S105

The processing module caches a search requirement of the second search request based on that a storage module requested in the first search request is the same as a storage module requested in the second search request

A processing module receives a write request

S202

The processing module obtains a data table based on the write request

S203

The processing module determines first key information of a first entry in the data table

S204

The processing module writes the first entry into a first storage module based on the first key information and according to a predetermined algorithm

DATA SEARCH METHOD AND APPARATUS, AND NETWORK DEVICE

CROSS-REFERENCE TO RELATED APPLICATIONS

This is a continuation of International Patent Application No. PCT/CN2022/140472 filed on Dec. 20, 2022, which claims priority to Chinese Patent Application No. 202210024548.4 filed on Jan. 7, 2022 and Chinese Patent Application No. 202210257749.9 filed on Mar. 16, 2022. All of the aforementioned applications are hereby incorporated by reference in their entireties.

TECHNICAL FIELD

The present disclosure relates to the field of network technologies, and in particular, to a data search method and apparatus, and a network device.

BACKGROUND

A network device often needs to search for data in a working process. For example, the network device needs to process a packet by searching for a data table. The data table may be various possible tables such as a packet forwarding table.

With the increase of network traffic, network devices in a network often need to search for data in parallel. For example, if a specific network device needs to process a plurality of packets at a same moment or in a same cycle (that is, the network device needs to process the plurality of packets in parallel), the network device needs to be capable of searching for a data table for the plurality of packets in parallel.

In a scenario in which the specific network device searches for data in parallel, how to avoid a conflict in a parallel search process performed by the network device, and reduce difficulty of parallel data search by the network device is an urgent problem to be resolved.

SUMMARY

The present disclosure provides a data search method and apparatus, and a network device. The technical solutions of the present disclosure are as follows.

According to a first aspect, a data search apparatus is provided. The data search apparatus is applied to a network device, and the data search apparatus includes a plurality of storage modules. The plurality of storage modules are configured to store a data table, any one of the plurality of storage modules stores a part of entries of the data table, any entry in the data table is unique in the plurality of storage modules, and storage addresses of entries stored in at least one of the plurality of storage modules are inconsecutive.

According to the technical solutions provided in the present disclosure, the plurality of storage modules included in the data search apparatus are configured to store the data table, and the any one of the plurality of storage modules stores the part of entries of the data table. In addition, the storage addresses of the entries stored in the at least one of the plurality of storage modules are inconsecutive. There-fore, in most cases, there is a low probability that entries requested in a plurality of search requests (for example, read/write requests) processed in parallel by the data search apparatus are located in a same storage module. This helps reduce a probability of a conflict in a parallel search process performed by the data search apparatus, thereby reducing difficulty of parallel data search.

Optionally, the data search apparatus further includes a processing module. The processing module is connected to the plurality of storage modules. The processing module is configured to determine, based on first key information carried in a first search request, a first storage module and a first entry stored in the first storage module. The plurality of storage modules include the first storage module, the data table includes the first entry, and the first search request is a search request received by the processing module. For example, the processing module first determines the first storage module based on the first key information, and then determines, based on the first key information, the first entry stored in the first storage module.

Optionally, the first storage module is determined further based on a first mapping relationship. The first mapping relationship includes a mapping relationship between the first key information and an identifier of the first storage module. That is, the processing module determines the first storage module based on the first key information and the first mapping relationship. The first mapping relationship may be a mapping table, a mapping formula, a mapping algorithm, or the like.

Optionally, the processing module is configured to determine a first storage address based on the first key information. The first storage address indicates a storage location of the first entry in the first storage module. In other words, the processing module determines the first storage address based on the first key information, and determines, based on the first storage address, the first entry stored in the first storage module.

Optionally, the processing module is configured to: determine an offset address of the first entry in the first storage module based on the first key information and a second mapping relationship (where, for ease of description, the offset address of the first entry in the first storage module is referred to as a first offset address); and determine the first storage address based on the first offset address. The second mapping relationship includes a mapping relationship between the first key information and the first offset address. In the present disclosure, the first mapping relationship and the second mapping relationship may be two mapping tables that are independent of each other. In some scenarios, the first mapping relationship and the second mapping relation-ship may be located in a same mapping table (for example, referred to as a target mapping table), and the target mapping table includes the mapping relationship between the first key information and the identifier of the first storage module, and includes the mapping relationship between the first key information and the first offset address. For example, the target mapping table includes a mapping relationship between the first key information, the identifier of the first storage module, and the first offset address.

Optionally, the processing module is further configured to: obtain the data table based on a write request, where the write request is a write request received by the processing module; determine the first key information of the first entry in the data table; and write the first entry into the first storage module based on the first key information and according to a predetermined algorithm. The predetermined algorithm is used to make storage addresses of entries written into the at least one of the plurality of storage modules inconsecutive.

According to the technical solutions provided in the present disclosure, the processing module writes an entry in the data table into a storage module according to the predetermined algorithm, so that the storage addresses of the entries stored in the at least one of the plurality of storage modules are inconsecutive. Therefore, in most cases, the probability of the conflict in the parallel search process performed by the data search apparatus can be reduced.

Optionally, the predetermined algorithm includes one of a hash algorithm and a random algorithm.

Optionally, the processing module is further configured to generate the first mapping relationship. The first mapping relationship includes the mapping relationship between the first key information and the identifier of the first storage module. The processing module generates the first mapping relationship, so that the processing module can determine, based on the first mapping relationship and key information carried in a search request, a storage module requested in the search request.

Optionally, the processing module is further configured to generate the second mapping relationship. The second mapping relationship includes the mapping relationship between the first key information and the first offset address. The processing module generates the second mapping relationship, so that the processing module can determine, based on the second mapping relationship and key information carried in a search request, an offset address of an entry requested in the search request.

Optionally, the processing module is further configured to: receive a second search request, where the second search request carries second key information, and the first search request and the second search request are search requests that need to be simultaneously processed by the processing module; determine the first storage module based on the second key information; and cache a search requirement of the second search request based on that a storage module requested in the first search request is the same as a storage module requested in the second search request. That is, in a process of processing the first search request, the processing module suspends processing of the second search request, and the processing module may continue to process the second search request after completing processing of the first search request.

According to the technical solutions provided in the present disclosure, the first search request and the second search request are the search requests that need to be simultaneously processed by the processing module, the storage module requested in the first search request is the same as the storage module requested in the second search request, and the processing module caches the search requirement of the second search request, so that a conflict between a processing process of the first search request and a processing process of the second search request can be avoided.

Optionally, the data search apparatus further includes a cache module. The cache module is connected to the processing module. The cache module is configured to store an entry with access frequency greater than a frequency threshold in the data table. The processing module is further configured to determine, based on the first key information carried in the first search request, that the first entry is not stored in the cache module. Specifically, after receiving the first search request, the processing module first determines, based on the first key information carried in the first search request, whether the first entry is stored in the cache module. If the processing module determines that the first entry is not stored in the cache module, the processing module determines, based on the first key information, the first storage module and the first entry stored in the first storage module. If the processing module determines that the first entry is stored in the cache module, the processing module determines the first entry stored in the cache module. That is, if the first entry is stored in the cache module, the processing module preferentially determines the first entry stored in the cache module, and if the first entry is not stored in the cache module, the processing module determines the first entry stored in a storage module. For example, the first search request is a read request. If the first entry is stored in the cache module, the processing module preferentially reads the first entry stored in the cache module. If the first entry is not stored in the cache module, the processing module reads the first entry stored in the storage module.

According to the technical solutions provided in the present disclosure, the entry with the access frequency greater than the frequency threshold is stored in the cache module. After the processing module receives a search request, when an entry requested in the search request is stored in the cache module, the processing module determines, from the cache module, the entry requested in the search request, without determining, from a storage module, the entry requested in the search request; or when the entry requested in the search request is not stored in the cache module, the processing module determines, from the storage module, the entry requested in the search request. A speed at which the processing module determines the entry from the cache module is faster than a speed at which the processing module determines the entry from the storage module, and when the entry requested in the search request is stored in the cache module, the processing module does not need to determine, from the storage module, the entry requested in the search request. Therefore, a speed and efficiency that are of determining the entry by the processing module are improved, thereby improving efficiency of processing the search request by the processing module.

Optionally, the processing module includes a switching module and a plurality of search submodules. The switching module is connected to the plurality of search submodules, and the plurality of search submodules are connected to the plurality of storage modules in a one-to-one correspondence. The switching module is configured to determine a storage module that stores an entry in the data table. The plurality of search submodules are configured to determine an entry in the data table stored in the plurality of storage modules.

Optionally, the switching module is configured to determine the first storage module based on the first key information. A first search submodule is configured to determine, based on the first key information, the first entry stored in the first storage module. The plurality of search submodules include the first search submodule.

Optionally, the data search apparatus further includes a cache module. The cache module includes a plurality of cache submodules, and the switching module is further connected to the plurality of cache submodules. The plurality of cache submodules are configured to store an entry with access frequency greater than a frequency threshold in the data table. The switching module is further configured to determine, based on the first key information carried in the first search request, that the first entry is not stored in a first cache submodule. The plurality of cache submodules include the first cache submodule.

Optionally, the processing module includes a switching module and a search module. The switching module is connected to the search module, and the switching module is connected to the plurality of storage modules. The search module is configured to: determine a storage module that stores an entry in the data table; and determine, through the switching module, an entry in the data table stored in the plurality of storage modules. That is, the switching module performs transparent transmission of information between the search module and a storage module, and a function of the switching module may be to provide communication channels between the search module and the plurality of storage modules.

Optionally, the search module is configured to: determine the first storage module based on the first key information; and determine, through the switching module based on the first key information, the first entry stored in the first storage module. That is, the switching module may perform transparent transmission of the first key information.

Optionally, the data search apparatus further includes a cache module. The cache module includes a plurality of cache submodules, and the search module is further connected to the plurality of cache submodules. The plurality of cache submodules are configured to store an entry with access frequency greater than a frequency threshold in the data table. The search module is further configured to determine, based on the first key information carried in the first search request, that the first entry is not stored in a first cache submodule. The plurality of cache submodules include the first cache submodule.

Optionally, the search module includes a plurality of search submodules. The plurality of search submodules and the plurality of cache submodules are in a one-to-one correspondence. A first search submodule is configured to: determine, based on the first key information carried in the first search request, that the first entry is not stored in the first cache submodule; and determine, based on the first key information, the first storage module and the first entry stored in the first storage module, where the plurality of search submodules include the first search submodule.

Optionally, a quantity of the plurality of storage modules is greater than a quantity of the plurality of cache submodules. The quantity of the plurality of cache submodules is determined based on a parallel processing capability (or a parallel processing requirement) of the data search apparatus. For example, the quantity of the plurality of cache submodules is equal to a maximum quantity of search requests that can be simultaneously processed by the data search apparatus.

According to the technical solutions provided in the present disclosure, the quantity of the cache submodules included in the cache module may be equal to the maximum quantity of search requests that can be simultaneously processed by the data search apparatus. In the present disclosure, the quantity of the storage modules is set to be greater than the quantity of the cache submodules included in the cache module. In other words, the quantity of the storage modules is set to be greater than the maximum quantity of search requests that can be simultaneously processed by the data search apparatus. In this way, a probability that a same storage module is accessed in a plurality of search requests in parallel can be reduced, a conflict in a parallel search process for the plurality of search requests is avoided, and search performance of the data search apparatus can be ensured.

Optionally, the network device includes a network processor (NP) chip, where the NP chip includes the data search apparatus in the present disclosure. For example, the network device may be a switch, a router, or the like.

Optionally, the data table includes a packet forwarding table.

According to a second aspect, a network device is provided, and includes the data search apparatus provided in any one of the first aspect or the optional implementations of the first aspect. For example, the network device includes an NP chip. The NP chip includes the data search apparatus. The network device may be a switch, a router, or the like.

According to a third aspect, a data search method is provided, and is applied to a data search apparatus. The data search apparatus includes a processing module and a plurality of storage modules. The plurality of storage modules are configured to store a data table, any one of the plurality of storage modules stores a part of entries of the data table, any entry in the data table is unique in the plurality of storage modules, and storage addresses of entries stored in at least one of the plurality of storage modules are inconsecutive. The method includes: The processing module receives a first search request, where the first search request carries first key information. The processing module determines, based on the first key information, a first storage module and a first entry stored in the first storage module, where the plurality of storage modules include the first storage module, and the data table includes the first entry.

According to the technical solutions provided in the present disclosure, the plurality of storage modules included in the data search apparatus are configured to store the data table, and the any one of the plurality of storage modules stores the part of entries of the data table. In addition, the storage addresses of the entries stored in the at least one of the plurality of storage modules are inconsecutive. Therefore, in most cases, there is a low probability that entries requested in a plurality of search requests (for example, read/write requests) processed in parallel by the data search apparatus are located in a same storage module. This helps reduce a probability of a conflict in a parallel search process performed by the data search apparatus, thereby reducing difficulty of parallel data search.

Optionally, that the processing module determines, based on the first key information, a first storage module includes: The processing module determines the first storage module based on the first key information and a first mapping relationship, where the first mapping relationship includes a mapping relationship between the first key information and an identifier of the first storage module. The first mapping relationship may be a mapping table, a mapping formula, a mapping algorithm, or the like.

Optionally, that the processing module determines, based on the first key information, a first entry stored in the first storage module includes: The processing module determines a first storage address based on the first key information, where the first storage address indicates a storage location of the first entry in the first storage module. The processing module may determine, based on the first storage address, the first entry stored in the first storage module.

Optionally, that the processing module determines a first storage address based on the first key information includes: The processing module determines a first offset address based on the first key information and a second mapping relationship; and determines the first storage address based on the first offset address. The second mapping relationship includes a mapping relationship between the first key information and the first offset address. In the present disclosure, the first mapping relationship and the second mapping relationship may be two mapping tables that are independent of each other. In some scenarios, the first mapping relationship and the second mapping relationship may be located in a same mapping table (for example, referred to as a target mapping table), and the target mapping table includes the mapping relationship between the first key information and the identifier of the first storage module, and includes the mapping relationship between the first key information and the first offset address. For example, the target mapping table includes a mapping relationship between the first key information, the identifier of the first storage module, and the first offset address.

Optionally, the method further includes: The processing module obtains the data table based on a write request, where the write request is a write request received by the processing module. The processing module determines the first key information of the first entry in the data table. The processing module writes the first entry into the first storage module based on the first key information and according to a predetermined algorithm. The predetermined algorithm is used to make storage addresses of entries written into the at least one of the plurality of storage modules inconsecutive.

According to the technical solutions provided in the present disclosure, the processing module writes an entry in the data table into a storage module according to the predetermined algorithm, so that the storage addresses of the entries stored in the at least one of the plurality of storage modules are inconsecutive. Therefore, in most cases, the probability of the conflict in the parallel search process performed by the data search apparatus can be reduced.

Optionally, the predetermined algorithm includes one of a hash algorithm and a random algorithm.

Optionally, the method further includes: The processing module generates the first mapping relationship, where the first mapping relationship includes the mapping relationship between the first key information and the identifier of the first storage module. The processing module generates the first mapping relationship, so that the processing module can determine, based on the first mapping relationship and key information carried in a search request, a storage module requested in the search request.

Optionally, the method further includes: The processing module generates the second mapping relationship, where the second mapping relationship includes the mapping relationship between the first key information and the first offset address. The processing module generates the second mapping relationship, so that the processing module can determine, based on the second mapping relationship and key information carried in a search request, an offset address of an entry requested in the search request.

Optionally, the method further includes: The processing module receives a second search request, where the second search request carries second key information, and the first search request and the second search request are search requests that need to be simultaneously processed by the processing module. The processing module determines the first storage module based on the second key information. The processing module caches a search requirement of the second search request based on that a storage module requested in the first search request is the same as a storage module requested in the second search request. That is, in a process of processing the first search request, the processing module suspends processing of the second search request, and the processing module may continue to process the second search request after completing processing of the first search request.

According to the technical solutions provided in the present disclosure, the first search request and the second search request are the search requests that need to be simultaneously processed by the processing module, the storage module requested in the first search request is the same as the storage module requested in the second search request, and the processing module caches the search requirement of the second search request, so that a conflict between a processing process of the first search request and a processing process of the second search request can be avoided.

Optionally, the data search apparatus further includes a cache module. The cache module is configured to store an entry with access frequency greater than a frequency threshold in the data table. That the processing module determines, based on the first key information, a first storage module and a first entry stored in the first storage module includes: The processing module determines that the first entry is not stored in the cache module. The processing module determines, based on the first key information, the first storage module and the first entry stored in the first storage module.

Optionally, if the first entry is stored in the cache module, the processing module determines, based on the first key information, the first entry stored in the cache module. That is, if the first entry is stored in the cache module, the processing module preferentially determines the first entry stored in the cache module, and if the first entry is not stored in the cache module, the processing module determines the first entry stored in a storage module. For example, the first search request is a read request. If the first entry is stored in the cache module, the processing module directly reads the first entry stored in the cache module. If the first entry is not stored in the cache module, the processing module reads the first entry stored in the storage module.

According to the technical solutions provided in the present disclosure, because the cache module included in the data search apparatus is configured to store the entry with the access frequency greater than the frequency threshold in the data table, after the processing module receives a search request, when an entry requested in the search request is stored in the cache module, the processing module determines, from the cache module, the entry requested in the search request, without determining, from a storage module, the entry requested in the search request; or when the entry requested in the search request is not stored in the cache module, the processing module determines, from the storage module, the entry requested in the search request. A speed at which the processing module determines the entry from the cache module is faster than a speed at which the processing module determines the entry from the storage module, and when the entry requested in the search request is stored in the cache module, the processing module does not need to determine, from the storage module, the entry requested in the search request. Therefore, a speed and efficiency that are of determining the entry by the processing module are improved, thereby improving efficiency of processing the search request by the processing module.

Optionally, the processing module includes a switching module and a plurality of search submodules. The switching module is connected to the plurality of search submodules, and the plurality of search submodules are connected to the plurality of storage modules in a one-to-one correspondence. That the processing module determines, based on the first key information, the first storage module includes: The switching module determines the first storage module based on the first key information. That the processing module determines, based on the first key information, the first entry stored in the first storage module includes: A first search submodule determines, based on the first key information, the first entry stored in the first storage module, where the plurality of search submodules include the first search submodule.

Optionally, the data search apparatus further includes a cache module. The cache module includes a plurality of cache submodules, and the switching module is further connected to the plurality of cache submodules. The plurality of cache submodules are configured to store an entry with access frequency greater than a frequency threshold in the data table. That the switching module determines the first storage module based on the first key information includes: The switching module determines that the first entry is not stored in a first cache submodule. The switching module determines the first storage module based on the first key information. The plurality of cache submodules include the first cache submodule.

Optionally, the processing module includes a switching module and a search module. The switching module is connected to the search module, and the switching module is connected to the plurality of storage modules. That the processing module determines, based on the first key information, the first storage module includes: The search module determines the first storage module based on the first key information. That the processing module determines, based on the first key information, the first entry stored in the first storage module includes: The search module determines, based on the first key information and through the switching module, the first entry stored in the first storage module. That is, the switching module may perform transparent transmission of the first key information.

Optionally, the data search apparatus further includes a cache module. The cache module includes a plurality of cache submodules, and the search module is further connected to the plurality of cache submodules. The plurality of cache submodules are configured to store an entry with access frequency greater than a frequency threshold in the data table. That the search module determines the first storage module based on the first key information includes: The search module determines that the first entry is not stored in a first cache submodule. The search module determines the first storage module based on the first key information. The plurality of cache submodules include the first cache submodule.

Optionally, a quantity of the plurality of storage modules is greater than a quantity of the plurality of cache submodules. The quantity of the plurality of cache submodules is determined based on a parallel processing capability (or a parallel processing requirement) of the data search apparatus. For example, the quantity of the plurality of cache submodules is equal to a maximum quantity of search requests that can be simultaneously processed by the data search apparatus.

According to the technical solutions provided in the present disclosure, the quantity of the cache submodules included in the cache module may be equal to the maximum quantity of search requests that can be simultaneously processed by the data search apparatus. In the present disclosure, the quantity of the storage modules is set to be greater than the quantity of the cache submodules included in the cache module. In other words, the quantity of the storage modules is set to be greater than the maximum quantity of search requests that can be simultaneously processed by the data search apparatus. In this way, a probability that a same storage module is accessed in a plurality of search requests in parallel can be reduced, a conflict in a parallel search process for the plurality of search requests is avoided, and search performance of the data search apparatus can be ensured.

Optionally, the data table includes a packet forwarding table.

The technical solutions provided in the present disclosure bring the following beneficial effects:

The present disclosure provides a data search method and apparatus, and a network device. The data search apparatus is applied to the network device. A plurality of storage modules included in the data search apparatus are configured to store a data table, any one of the plurality of storage modules stores a part of entries of the data table, any entry in the data table is unique in the plurality of storage modules, and storage addresses of entries stored in at least one of the plurality of storage modules are inconsecutive. Because the storage addresses of the entries stored in the at least one of the plurality of storage modules are inconsecutive, in most cases, there is a low probability that the data search apparatus accesses a same storage module of the plurality of storage modules at a same moment or in a same cycle. In other words, in most cases, there is a low probability that entries requested in a plurality of search requests (for example, read/write requests) processed in parallel by the data search apparatus are located in a same storage module. This helps reduce a probability of a conflict in a parallel search process performed by the data search apparatus, and reduce difficulty of parallel data search by the data search apparatus.

BRIEF DESCRIPTION OF DRAWINGS

FIG. 11 is a flowchart of another data search method according to an embodiment of the present disclosure;

FIG. 12 is a flowchart of a method for storing a data table according to an embodiment of the present disclosure.

DESCRIPTION OF EMBODIMENTS

Figures 1, 2:
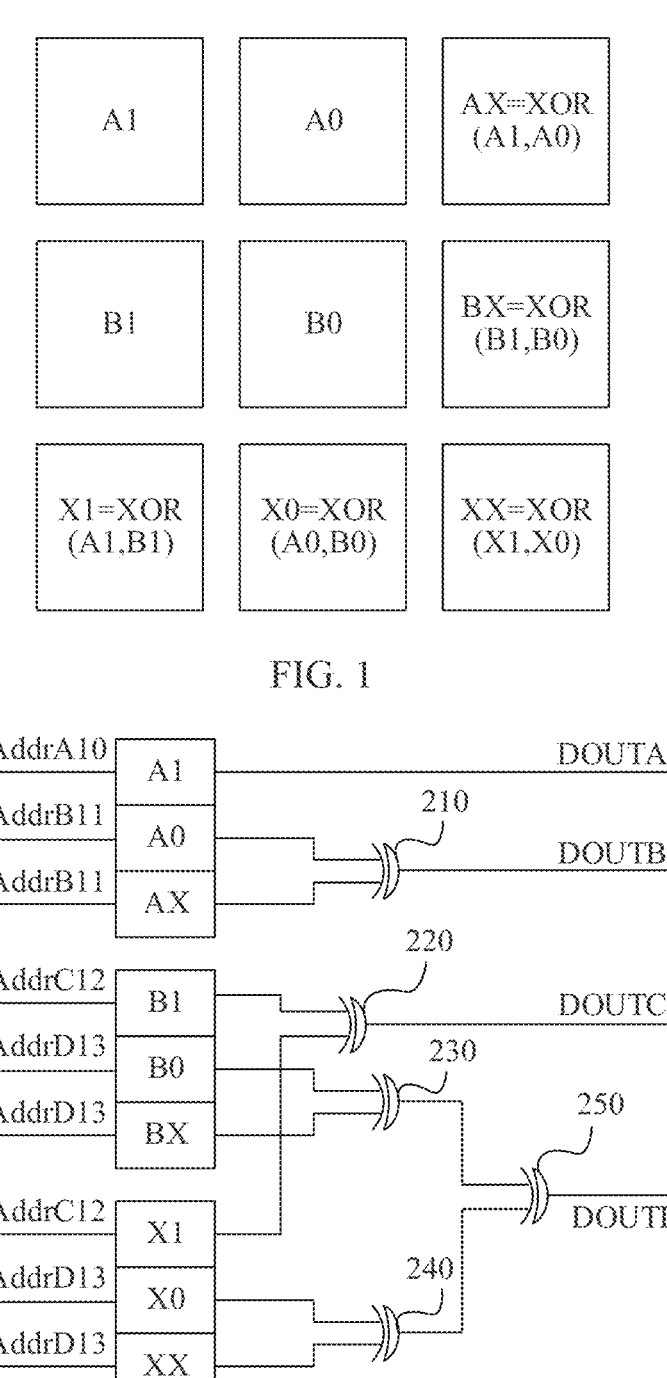
FIG. 1 is a diagram of a memory architecture.
FIG. 2 is a diagram of a processing circuit.

The following further describes in detail implementations of the present disclosure with reference to accompanying drawings.

A network device often needs to process a search request in a working process. The search request may include a read/write request (where the read/write request is a collective term for a read request and a write request). For example, the network device includes a storage module. The network device writes data into the storage module by processing a write request, and the network device reads, by processing a read request, data stored in the storage module. For example, the network device searches for, by processing a search request, data stored in the storage module. For example, the storage module stores a data table, and the network device processes a packet by searching for the data table stored in the storage module of the network device.

With the increase of network traffic, the network device often needs to process a plurality of search requests (for example, read/write requests) in parallel. In addition, in most cases, the plurality of search requests simultaneously processed by the network device belong to a same task, data requested in the plurality of search requests is continuous, and storage addresses of the continuous data in the storage module are also consecutive. That is, in most cases, the data with the consecutive storage addresses needs to be requested in the plurality of search requests processed in parallel by the network device. However, only one search operation (for example, a read operation or a write operation) is usually allowed to be performed at a same moment or in a same cycle on a same storage module. If storage addresses of data stored in the same storage module are consecutive, the data requested in the plurality of search requests processed in parallel by the network device is located in the same storage module in most cases. This easily causes a conflict in parallel processing of the plurality of search requests (where, for example, the conflict occurs in a parallel search process performed by the network device), and increases difficulty of parallel data search by the network device. Therefore, how to avoid the conflict in the parallel search process performed by the network device, and reduce the difficulty of the parallel data search is an urgent problem to be resolved.

In the present disclosure, the data table stored in the storage module of the network device may be various possible tables or data in a form of a table. In an example, the network device includes a forwarding chip. The forwarding chip includes a storage module. The storage module stores a packet forwarding table. The forwarding chip may search for, by processing a search request, the packet forwarding table stored in the storage module, to perform packet forwarding. With the increase of the network traffic, a bandwidth of the forwarding chip increases continuously (where, for example, a bandwidth of a switch doubles every one to two years, and a bandwidth of a router doubles every two to three years), a packet per second (PPS) of the forwarding chip increases continuously, or even exceeds a clock frequency. In this case, the forwarding chip may need to process a plurality of packets in parallel at a same moment or in a same cycle. Therefore, the forwarding chip needs to be capable of searching for the packet forwarding table for the plurality of packets in parallel. Therefore, how to avoid a conflict in a parallel search process performed by the forwarding chip is an urgent problem to be resolved.

Solutions for resolving the problem of the conflict in the parallel search process performed by the forwarding chip includes:

Solution 1: A plurality of storage modules are disposed in the forwarding chip, and the same packet forwarding table is stored in the plurality of storage modules. When the forwarding chip needs to process the plurality of search requests in parallel, the forwarding chip searches the plurality of storage modules for the packet forwarding table in parallel based on a one-to-one correspondence between the plurality of search requests and the plurality of storage modules. Because the packet forwarding table searched in parallel by the forwarding chip is located in the plurality of storage modules, in other words, storage modules accessed in parallel by the forwarding chip are different storage modules, the conflict in the parallel search process performed by the forwarding chip can be avoided. However, in the solution 1, the plurality of storage modules need to be disposed in the forwarding chip to store the same packet forwarding table. Therefore, overheads of storage resources (for example, memory resources) of the forwarding chip are high, and the plurality of storage modules easily cause a large area of the forwarding chip and high costs of the forwarding chip.

Solution 2: An N-read N-write memory architecture is disposed in the forwarding chip to store the same packet forwarding table, a processing circuit corresponding to the memory architecture is disposed in the forwarding chip, and the packet forwarding table stored in the memory architecture is searched in parallel through the processing circuit.

A 4-read 4-write memory architecture is used as an example. For the memory architecture, refer to FIG. 1. For the processing circuit corresponding to the memory architecture, refer to FIG. 2. As shown in FIG. 1, the memory architecture includes storage modules A0, A1, B0, and B1, and the storage modules A0, A1, B0, and B1 are configured to store the packet forwarding table. In addition, each of the storage modules A0, A1, B0, and B1 is configured to store a part of data in the packet forwarding table. The storage modules A0, A1, B0, and B1 are separately configured to provide one-time read/write performance. To support a 4-read 4-write requirement, the memory architecture further includes storage modules AX, BX, X0, X1, and XX. A storage module AX is configured to store an exclusive OR (XOR) result of data in two storage modules A0 and A1. A storage module BX is configured to store an exclusive OR result of data in two storage modules B0 and B1. A storage module X1 is configured to store an exclusive OR result of data in two storage modules A1 and B1. A storage module X0 is configured to store an exclusive OR result of data in two storage modules A0 and B0. A storage module XX is configured to store an exclusive OR result of data in two storage modules X1 and X0. As shown in FIG. 2, the processing circuit includes gate circuits 210, 220, 230, 240, and 250. An output end of a storage module A1 is connected to a port DOUTA. An output end of a storage module A0 and an output end of the storage module AX are separately connected to an input end of a gate circuit 210, and an output end of the gate circuit 210 is connected to a port DOUTB. An output end of a storage module B1 and an output end of the storage module X1 are separately connected to an input end of a gate circuit 220, and an output end of the gate circuit 220 is connected to a port DOUTC. An output end of a storage module B0 and an output end of the storage module BX are separately connected to an input end of a gate circuit 230. An output end of the storage module X0 and an output end of the storage module XX are separately connected to an input end of a gate circuit 240. An output end of the gate circuit 230 and an output end of the gate circuit 240 are separately connected to an input end of a gate circuit 250. An output end of the gate circuit 250 is connected to a port DOUTD.

It is assumed that the forwarding chip needs to process four search requests AddrA10, AddrB11, AddrC12, and AddrD13 in parallel (where AddrA10 is from a port A and used for accessing data whose storage address is 10, AddrB11 is from a port B and used for accessing data whose storage address is 11, AddrC12 is from a port C and used for accessing data whose storage address is 12, and AddrD13 is from a port D and used for accessing data whose storage address is 13), and all data requested in the four search requests is stored in the storage module A1. For a search request AddrA10, the forwarding chip reads, based on the search request AddrA10, the data that is stored in the storage module A1 and whose storage address is 10, and outputs the data through the port DOUTA. For a search request AddrB11, because the storage module A1 is accessed, the storage module A1 cannot be accessed in the search request AddrB11. The forwarding chip reads, based on the search request AddrB11, data that is stored in the storage module A0 and whose storage address is 11 and data that is stored in the storage module AX and whose storage address is 11, inputs, into the gate circuit 210, data read from storage modules A0 and AX, performs, through the gate circuit 210, exclusive OR processing (A0⊕AX=A0⊕(A1⊕A0)=A1) on the data read from the storage modules A0 and AX, and outputs an exclusive OR result through the port DOUTB, where the exclusive OR result is the data requested in the search request AddrB11. For a search request AddrC12, because storage modules A0, A1, and AX are accessed, the storage modules A0, A1, and AX cannot be accessed in the search request AddrC12. The forwarding chip reads, based on the search request AddrC12, data that is stored in the storage module B1 and whose storage address is 12 and data that is stored in the storage module X1 and whose storage address is 12, inputs, into the gate circuit 220, data read from storage modules B1 and X1, performs, through the gate circuit 220, exclusive OR processing (B1⊕X1=B1⊕ (A1⊕B1)=A1) on the data read from the storage modules B1 and X1, and outputs an exclusive OR result through the port DOUTC, where the exclusive OR result is the data requested in the search request AddrC12. For a search request AddrD13, because storage modules A0, A1, AX, B1, and X1 are all accessed, the storage modules A0, A1, AX, B1, and X1 cannot be accessed in the search request AddrD13. The forwarding chip reads, based on the search request AddrD13, data that is stored in the storage module B0 and whose storage address is 13, data that is stored in the storage module BX and whose storage address is 13, data that is stored in the storage module X0 and whose storage address is 13, and data that is stored in the storage module XX and whose storage address is 13, inputs, into the gate circuit 230, data read from the storage modules B0 and BX, inputs, into the gate circuit 240, data read from the storage modules X0 and XX, performs, through the gate circuit 230, exclusive OR processing (B0⊕BX=B0⊕(B1⊕B0)=B1) on the data read from the storage modules B0 and BX, performs, through the gate circuit 240, exclusive OR processing (X0⊕XX=X0⊕(X1⊕X0)=X1=A1 ⊕B1) on the data read from the storage modules X0 and XX, where an exclusive OR result output by the gate circuit 230 and an exclusive OR result output by the gate circuit 240 are separately input into the gate circuit 250, performs, through the gate circuit 250, exclusive OR processing (B1⊕(A1⊕B1)=A1) on the exclusive OR result output by the gate circuit 230 and the exclusive OR result output by the gate circuit 240, and outputs an exclusive OR result of the gate circuit 250 through the port DOUTD, where the exclusive OR result is the data requested in the search request AddrD13.

In the solution 2, a plurality of storage modules are configured to store one packet forwarding table, and each storage module stores the part of data in the packet forwarding table. Therefore, compared with the solution 1, the solution 2 avoids the conflict in the parallel search process, and reduces overheads of storage resources (for example, memory resources) of the forwarding chip (where only one copy of packet forwarding table is stored, which occupies less storage space). However, in the solution 2, the additional process circuit needs to be added. As a result, processing logic of the forwarding chip is complex and power consumption is high. In addition, the solution 2 requires additional storage modules (for example, AX, BX, X0, X1, and XX) to store an exclusive OR result of data in the packet forwarding table, and the overheads of the storage resources of the forwarding chip are still high.

Embodiments of the present disclosure provide a data search method and apparatus, and a network device. The data search apparatus includes a plurality of storage modules. The plurality of storage modules are configured to store a data table, any one of the plurality of storage modules stores a part of entries of the data table, any entry in the data table is unique in the plurality of storage modules, and storage addresses of entries stored in at least one of the plurality of storage modules are inconsecutive. In most cases, data with consecutive storage addresses needs to be requested in a plurality of search requests (for example, read/write requests) processed in parallel by the network device. However, in the present disclosure, the storage addresses of the entries stored in the at least one storage module included in the data search apparatus are inconsecutive. Therefore, in most cases, there is a low probability that entries requested in the plurality of search requests processed in parallel by the data search apparatus are located in a same storage module, so that a probability of a conflict in a process of processing the plurality of search requests in parallel by the data search apparatus can be reduced. For example, a probability of a conflict in a parallel search process performed by the data search apparatus is reduced, thereby reducing difficulty of parallel data search by the data search apparatus.

The data search apparatus provided in this embodiment of the present disclosure may be included in a forwarding chip (for example, an NP chip). The plurality of storage modules included in the data search apparatus are configured to store the same data table, and the any one of the plurality of storage modules stores the part of entries of the data table. That is, the data search apparatus stores entries of the same data table in different storage modules in a distributed manner. Therefore, in comparison with the foregoing solution 1, the technical solution provided in the present disclosure helps reduce overheads of storage resources of the forwarding chip, reduce an area of the forwarding chip, and reduce costs of the forwarding chip. In comparison with the foregoing solution 2, in the technical solution provided in the present disclosure, an additional processing circuit or additional storage modules (for example, AX, BX, X0, X1, and XX) do not need to be added, so that processing logic of the forwarding chip is simplified, power consumption of the forwarding chip and the overheads of the storage resources of the forwarding chip are reduced, the area of the forwarding chip is reduced, and the costs of the forwarding chip are reduced.

The following describes the technical solutions of the present disclosure. First, an embodiment of a data search apparatus in the present disclosure is described with reference to the accompanying drawings.

Figure 3:
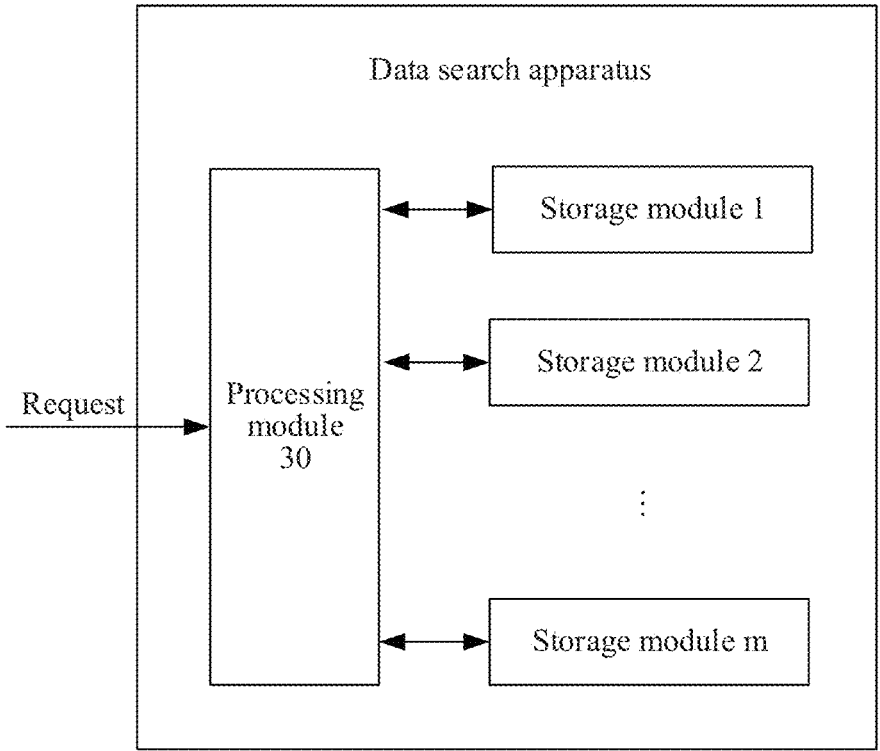
FIG. 3 is a diagram of a structure of a data search apparatus according to an embodiment of the present disclosure.

FIG. 3 is a diagram of a structure of a data search apparatus according to an embodiment of the present disclosure. The data search apparatus is applied to a network device. As shown in FIG. 3, the data search apparatus includes a plurality of storage modules (where, in FIG. 3, an example in which the plurality of storage modules are storage modules 1 to m is used for description, and m is an integer greater than 1). The plurality of storage modules are configured to store a data table (for example, a data table 1), any one of the plurality of storage modules stores a part of entries of the data table 1, any entry in the data table 1 is unique in the plurality of storage modules, and storage addresses of entries stored in at least one of the plurality of storage modules are inconsecutive. That is, the entries of the data table 1 are stored in the plurality of storage modules in a distributed manner.

The data table 1 may be various possible tables or data in a form of a table. For example, the data table 1 is a packet forwarding table. A storage address of any entry stored in any storage module may indicate a storage location of the entry in the storage module. Optionally, the storage modules 1 to m are included in a memory of the network device, and a storage address of any entry stored in the storage module may be a memory address of the entry. In this embodiment of the present disclosure, an example in which the storage modules 1 to m are configured to store the data table is used for description. In another embodiment, the storage modules 1 to m may be further configured to store another data structure, and any one of the storage modules 1 to m stores a part of data of the data structure. Storage addresses of data stored in at least one of the storage modules 1 to m are inconsecutive. For example, the data structure may be program code. This is not limited in embodiments of the present disclosure.

In conclusion, according to the data search apparatus provided in this embodiment of the present disclosure, the data search apparatus includes the plurality of storage modules, the plurality of storage modules are configured to store the data table, the any one of the plurality of storage modules stores the part of entries of the data table, and the storage addresses of the entries stored in the at least one of the plurality of storage modules are inconsecutive. Therefore, in most cases, there is a low probability that entries requested in a plurality of search requests processed in parallel by the data search apparatus are located in a same storage module. This helps reduce a probability of a conflict in a process of processing the plurality of search requests in parallel by the data search apparatus. For example, a probability of a conflict in a parallel search process performed by the data search apparatus is reduced, thereby reducing difficulty of parallel data search.

Still refer to FIG. 3. The data search apparatus provided in the present disclosure may further include a processing module 30. The processing module 30 is separately connected to the storage modules 1 to m. The processing module 30 is configured to receive a search request, and determine, based on key information carried in the search request, a storage module requested in the search request and an entry that is stored in the storage module and that is requested in the search request. The key information carried in the search request may be key information of the entry requested in the search request, and key information of any entry may be located in the entry or may be other information related to the entry. For example, the data table 1 is the packet forwarding table, an entry in the packet forwarding table is a forwarding entry, the forwarding entry may include a packet address and a port identifier, and key information of the forwarding entry may be the packet address included in the forwarding entry. For another example, the key information of the entry may be a logical address of the entry, a hash value of the entry, or the like. This is not limited in embodiments of the present disclosure.

In an optional embodiment, the search request received by the processing module 30 includes a first search request, and the processing module 30 is configured to determine, based on first key information carried in the first search request, a first storage module and a first entry stored in the first storage module. The storage modules 1 to m include the first storage module, the data table 1 includes the first entry, and the first key information is key information of the first entry. For example, the processing module 30 first determines the first storage module based on the first key information, and then determines, based on the first key information, the first entry stored in the first storage module. For example, the first search request is a read request. That the processing module 30 determines the first entry stored in the first storage module may be that the processing module 30 reads the first entry stored in the first storage module.

In an optional embodiment, the first storage module is determined further based on a first mapping relationship. The first mapping relationship includes a mapping relationship between the first key information and an identifier of the first storage module. That is, the processing module 30 determines the first storage module based on the first key information and the first mapping relationship. For example, the first mapping relationship is a mapping table. The processing module 30 searches for the first mapping relationship based on the first key information, to determine the identifier of the first storage module corresponding to the first key information. Then, the processing module 30 determines the first storage module based on the identifier of the first storage module.

In this embodiment of the present disclosure, an example in which the first mapping relationship is the mapping table is used for description. In another embodiment, the first mapping relationship may alternatively be a mapping formula, a mapping algorithm, or the like. For example, the first mapping relationship is a hash algorithm. The processing module 30 may calculate a hash value of the first key information, and determine, based on the hash value of the first key information, the identifier of the first storage module storing the first entry. Optionally, the processing module 30 determines that the hash value of the first key information is the identifier of the first storage module storing the first entry. Alternatively, the processing module 30 determines a remainder of the hash value of the first key information as the identifier of the first storage module storing the first entry. Alternatively, the processing module 30 may determine values of fixed bits of the hash value of the first key information as the identifier of the first storage module storing the first entry. When the first mapping relationship is the mapping formula or the mapping algorithm, an identifier of each of the storage modules 1 to m may be determined using a corresponding mapping formula or a corresponding mapping algorithm before the processing module 30 stores the data table 1 in the storage modules 1 to m. This is not limited in embodiments of the present disclosure.

In an optional embodiment, the processing module 30 is configured to determine a first storage address based on the first key information. The first storage address indicates a storage location of the first entry in the first storage module. After determining the first storage address, the processing module 30 may determine, based on the first storage address, the first entry stored in the first storage module. The first storage address may be a physical address. In an example of the present disclosure, the processing module 30 determines a first offset address (to be specific, an offset address of the first entry in the first storage module) based on the first key information, and determines the first storage address based on the first offset address. For example, the processing module 30 maintains a second mapping relationship, the second mapping relationship is a mapping relationship between key information and an offset address, and the second mapping relationship includes a mapping relationship between the first key information and the first offset address. The processing module 30 determines the first offset address based on the first key information and the second mapping relationship, and determines the first storage address based on an initial address (where the initial address is a physical address) of the first storage module and the first offset address. For example, the second mapping relationship is a mapping table. The processing module 30 searches for the second mapping relationship based on the first key information, to determine the first offset address corresponding to the first key information. The processing module 30 may add the initial address of the first storage module and the first offset address to obtain the first storage address.

In this embodiment of the present disclosure, an example in which the second mapping relationship is the mapping table is used for description. In another embodiment, the second mapping relationship may alternatively be a mapping formula, a mapping algorithm, or the like. In this embodiment of the present disclosure, the first mapping relationship and the second mapping relationship may be two mapping tables that are independent of each other. In another embodiment, the first mapping relationship and the second mapping relationship may be located in a same mapping table (for example, referred to as a target mapping table), and the target mapping table includes the mapping relationship between the first key information and the identifier of the first storage module, and includes the mapping relationship between the first key information and the first offset address. For example, the target mapping table includes a mapping relationship between the first key information, the identifier of the first storage module, and the first offset address.

In an optional embodiment, the processing module 30 is further configured to: receive a second search request, where the second search request carries second key information, and the first search request and the second search request are search requests that need to be simultaneously processed by the processing module 30; determine the first storage module based on the second key information; and cache a search requirement of the second search request based on that a storage module requested in the first search request is the same as a storage module requested in the second search request (where the two requested storage modules are both the first storage module). For an implementation process in which the processing module 30 determines the first storage module based on the second key information, refer to the implementation process in which the processing module 30 determines the first storage module based on the first key information. The second search request is used to request an entry stored in the first storage module, and an entry requested in the second search request may be the first entry, or may not be the first entry. Because only one search operation (for example, a read/write operation) is usually allowed to be performed on a same storage module at a same moment or in a same cycle, when determining that the storage module requested in the first search request is the same as the storage module requested in the second search request, the processing module caches the search requirement of the second search request, so that a conflict between a processing process of the first search request and a processing process of the second search request can be avoided.

That the processing module 30 caches the search requirement of the second search request may mean that the processing module 30 suspends processing of the second search request when determining that the storage module requested in the first search request is the same as the storage module requested in the second search request. The processing module 30 may continue to process the second search request after the processing module 30 completes processing of the first search request. The processing module 30 may have cache space, and the processing module 30 may cache the search requirement of the second search request in the cache space of the processing module 30. For example, the processing module 30 receives a plurality of search requests including the second search request, and the plurality of search requests are all search requests that need to be simultaneously processed with the first search request by the processing module 30. In addition, storage modules requested in the plurality of search requests are the same as the storage module requested in the first search request. The processing module 30 may cache search requirements of the plurality of search requests in the cache space of the processing module 30. After the processing module 30 completes the processing of the first search request, the processing module 30 may schedule the plurality of search requests according to a scheduling algorithm, and continue to process the plurality of search requests. The scheduling algorithm may be a round robin (RR) algorithm, a weighed fair queueing (WFR) algorithm, a strict priority (SP) algorithm, or the like. In different service scenarios, the processing module 30 may schedule the search requests by using different scheduling algorithms, to ensure search performance of the data search apparatus.

Figure 4:
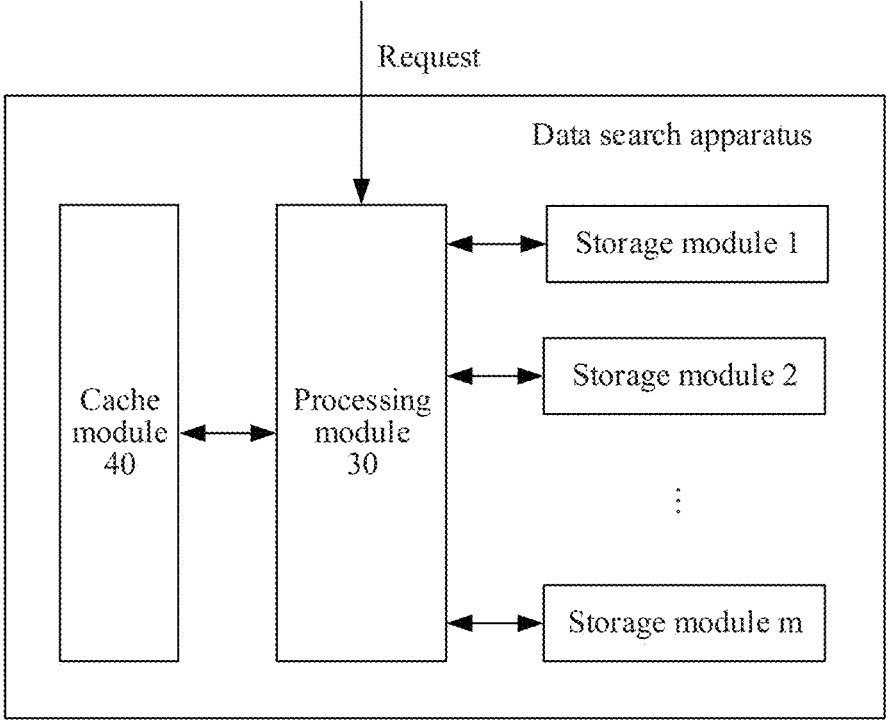
FIG. 4 is a diagram of a structure of another data search apparatus according to an embodiment of the present disclosure.

FIG. 4 is a diagram of a structure of another data search apparatus according to an embodiment of the present disclosure. Based on FIG. 3, the data search apparatus further includes a cache module 40. The cache module 40 is configured to store an entry with access frequency greater than a frequency threshold in a data table 1. To be specific, two copies of the entry with the access frequency greater than the frequency threshold in the data table 1 may be stored. One copy is stored in a storage module, and the other copy is stored in the cache module 40. A processing module 30 is further configured to: for each received search request, determine, based on key information carried in the search request, whether an entry requested in the search request is stored in the cache module 40; if the entry requested in the search request is stored in the cache module 40, determine the entry stored in the cache module 40; and if the entry requested in the search request is not stored in the cache module 40, determine, based on the key information carried in the search request, a storage module requested in the search request and the entry stored in the storage module.

For example, after receiving a first search request, the processing module 30 determines, based on first key information carried in the first search request, whether a first entry is stored in the cache module 40. If the processing module 30 determines that the first entry is stored in the cache module 40, the processing module 30 determines the first entry stored in the cache module 40. If the processing module 30 determines that the first entry is not stored in the cache module 40, the processing module 30 determines, based on the first key information, a first storage module and the first entry stored in the first storage module. For example, the first search request is a read request. If the processing module 30 determines that the first entry is stored in the cache module 40, the processing module 30 directly reads the first entry stored in the cache module 40. If the processing module 30 determines that the first entry is not stored in the cache module 40, the processing module 30 determines the first storage module based on the first key information, and reads the first entry stored in the first storage module. For example, a second search request is used to request a second entry, and second key information is key information of the second entry. After receiving the second search request, the processing module 30 determines, based on the second key information carried in the second search request, whether the second entry is stored in the cache module 40. If the processing module 30 determines that the second entry is stored in the cache module 40, the processing module 30 determines the second entry stored in the cache module 40. If the processing module 30 determines that the second entry is not stored in the cache module 40, the processing module 30 determines the first storage module based on the second key information. For example, the second search request is a read request. If the processing module 30 determines that the second entry is stored in the cache module 40, the processing module 30 directly reads the second entry stored in the cache module 40. If the processing module 30 determines that the second entry is not stored in the cache module 40, the processing module 30 determines the first storage module based on the second key information.

In an example, the entry with the access frequency greater than the frequency threshold in the data table 1 is referred to as a hot entry, and an association relationship between key information and the hot entry may be stored in the cache module 40. Each hot entry in the association relationship is the entry with the access frequency greater than the frequency threshold in the data table 1. The key information associated with each hot entry in the association relationship is key information of the hot entry. The processing module 30 may determine whether the association relationship in the cache module 40 includes the first key information. If the association relationship in the cache module 40 includes the first key information, the processing module 30 determines that the first entry is stored in the cache module 40, and determines, as the first entry, a hot entry associated with the first key information in the association relationship. If the association relationship in the cache module 40 does not include the first key information, the processing module 30 determines that the first entry is not stored in the cache module 40. For an implementation process in which the processing module 30 determines whether the second entry is stored in the cache module 40, refer to the implementation process in which the processing module 30 determines whether the first entry is stored in the cache module 40.

In this embodiment of the present disclosure, for any entry in the data table 1, if the entry is stored in the cache module 40, when processing a search request used to request the entry, the processing module 30 may determine, based on key information carried in the search request, that the entry is stored in the cache module 40. This case may be understood as that the processing module 30 hits the cache module 40. This state may be referred to as a cache hit state. If the entry is not stored in the cache module 40, when processing the search request used to request the entry, the processing module 30 determines, based on the key information carried in the search request, that the entry is not stored in the cache module 40. This case may be understood as that the processing module 30 misses the cache module 40. This state may be referred to as a cache miss state. The data search apparatus provided in this embodiment of the present disclosure includes the cache module 40, and the cache module 40 is configured to store the hot entry in the data table 1. Therefore, for a search request used to request the hot entry, the processing module 30 may determine, from the cache module 40, the entry requested in the search request, without determining, from the storage module, the entry requested in the search request. A speed at which the processing module 30 determines the entry from the cache module 40 is faster than a speed at which the processing module determines the entry from the storage module, and when the entry requested in the search request is stored in the cache module 40, the processing module 30 does not need to determine, from the storage module, the entry requested in the search request. Therefore, a speed and efficiency that are of determining the entry by the processing module 30 are improved, thereby improving efficiency of processing the search request by the processing module 30.

In this embodiment of the present disclosure, the processing module 30 may further update the entry stored in the cache module 40 in real time or periodically, and age out a cold entry stored in the cache module 40 in time. For example, the processing module 30 collects statistics on access frequency of entries in the data table 1 stored in storage modules 1 to m in real time or periodically, stores the hot entry in the data table 1 in the cache module 40 based on a statistical result, and deletes the cold entry in the data table 1 from the cache module 40 based on the statistical result (where, for example, as time goes by, because some entries stored in the cache module 40 are not accessed for a long time, access frequency of the entries each is less than the frequency threshold, and these entries become hot entries because the access frequency decreases). By updating the entry stored in the cache module 40, the processing module 30 may ensure that each of all entries stored in the cache module 40 is the entry with the access frequency greater than the frequency threshold in the data table 1.

Figure 5:
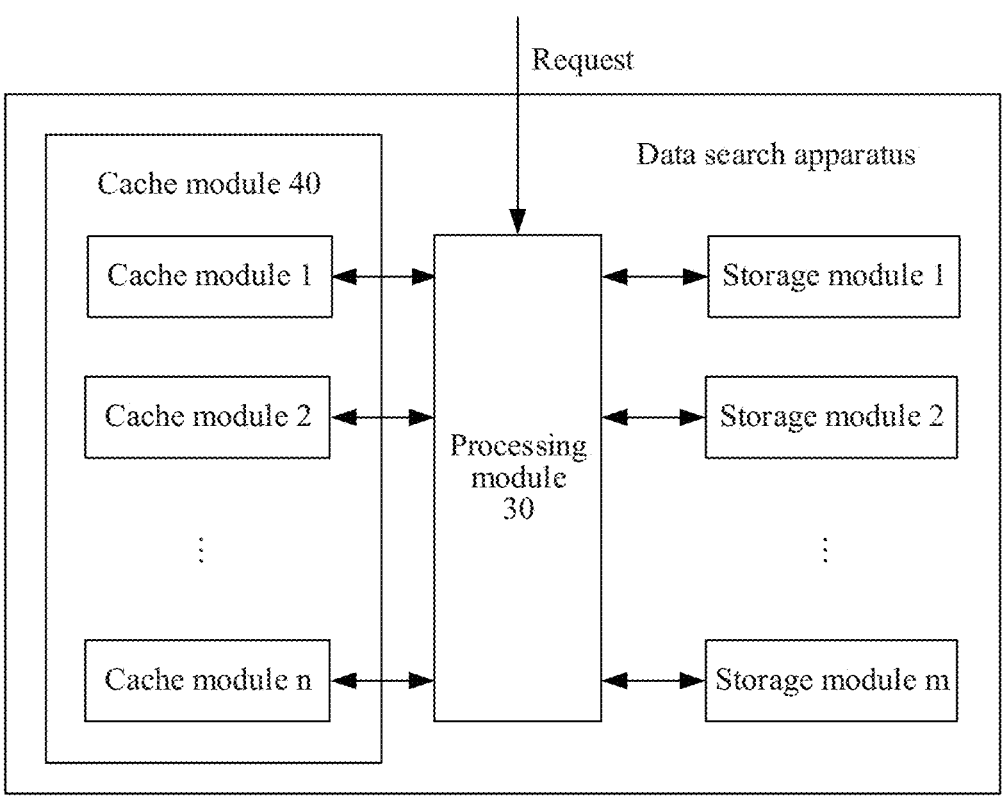
FIG. 5 is a diagram of a structure of still another data search apparatus according to an embodiment of the present disclosure.

In an optional embodiment, FIG. 5 is a diagram of a structure of still another data search apparatus according to an embodiment of the present disclosure. As shown in FIG. 5, a cache module 40 includes a plurality of cache submodules (where, in this embodiment of the present disclosure, an example in which the plurality of cache submodules are cache submodules 1 to n is used for description, and n is an integer greater than 1). A processing module 30 is separately connected to the cache submodules 1 to n, and the cache submodules 1 to n may be in a one-to-one correspondence with n search requests. For each search request in the n search requests that need to be processed in parallel by the processing module 30, the processing module 30 determines, based on key information carried in the search request, whether an entry requested in the search request is stored in a cache submodule corresponding to the search request. If the entry requested in the search request is stored in the cache submodule corresponding to the search request, the processing module 30 determines the entry stored in the cache submodule corresponding to the search request. If the entry requested in the search request is not stored in the cache submodule corresponding to the search request, the processing module 30 determines, based on the key information carried in the search request, a storage module requested in the search request, and determines the entry that is requested in the search request and that is stored in the storage module. A quantity (that is, a value of n) of the cache submodules included in the cache module 40 may be determined based on a parallel processing capability (or a parallel processing requirement) of the data search apparatus. For example, the quantity of the cache submodules included in the cache module 40 is equal to a maximum quantity of search requests that can be simultaneously processed by the data search apparatus.

For example, after receiving a first search request, the processing module 30 determines, based on first key information carried in the first search request, whether a first entry is stored in a first cache submodule (for example, a cache submodule 1). If the first entry is stored in the first cache submodule, the processing module 30 determines the first entry stored in the first cache submodule. If the first entry is not stored in the first cache submodule, the processing module 30 determines, based on the first key information, a first storage module and the first entry stored in the first storage module. After receiving a second search request, the processing module 30 determines, based on second key information carried in the second search request, whether a second entry is stored in a second cache submodule (for example, a cache submodule 2). If the second entry is stored in the second cache submodule, the processing module 30 determines the second entry stored in the second cache submodule. If the second entry is not stored in the second cache submodule, the processing module 30 determines the first storage module based on the second key information, and caches a search requirement of the second search request based on that a storage module requested in the first search request is the same as a storage module requested in the second search request (where the two requested storage modules are the first storage module).

In an optional embodiment, m is greater than n. That is, a quantity of storage modules is greater than the quantity of the cache submodules included in the cache module 40. Because the quantity of the cache submodules included in the cache module 40 may be equal to the maximum quantity of search requests that can be simultaneously processed by the data search apparatus, in this embodiment of the present disclosure, the quantity of storage modules is set to be greater than the quantity of the cache submodules included in the cache module 40, in other words, the quantity of storage modules is set to be greater than the maximum quantity of search requests that can be simultaneously processed by the data search apparatus. In this way, a probability that a same storage module is accessed in a plurality of search requests in parallel can be reduced, a conflict in a parallel search process for the plurality of search requests is avoided, and search performance of the data search apparatus can be ensured.

In this embodiment of the present disclosure, the processing module 30 is further configured to: obtain a data table 1 based on a received write request, and store the data table 1 in storage modules 1 to m. The processing module 30 stores the data table 1 to the storage modules 1 to m, so that the processing module 30 can search the storage modules 1 to m for an entry in the data table 1 based on a received search request.

In an optional embodiment, the processing module 30 is further configured to: obtain the data table 1 based on the write request received by the processing module 30; determine the first key information of the first entry in the data table 1; and write the first entry into the first storage module based on the first key information and according to a predetermined algorithm, where the predetermined algorithm is used to make storage addresses of entries written into at least one of the storage modules 1 to m inconsecutive. The predetermined algorithm may include one of a hash algorithm and a random algorithm. In an example, the write request carries indication information of the data table 1, and the processing module 30 obtains the data table 1 based on the indication information of the data table 1. The indication information of the data table 1 may be an identifier of the data table 1, a name of the data table 1, a storage location of the data table 1, or the like. After the processing module 30 obtains the data table 1, for each entry in the data table 1, the processing module 30 may obtain key information of the entry, and write the entry into one of the storage modules 1 to m based on the key information of the entry and according to the predetermined algorithm. In such a processing manner, the processing module 30 may store the data table 1 into the storage modules 1 to m, and enable any one of the storage modules 1 to m to store a part of entries of the data table 1, each entry in the data table 1 is unique in the storage modules 1 to m, and storage addresses of entries stored in the at least one of the storage modules 1 to m are inconsecutive.

An example in which the processing module 30 writes the first entry into the first storage module is used for description. After obtaining the data table 1, the processing module 30 first determines the first key information of the first entry in the data table 1, then determines, based on the first key information and according to the predetermined algorithm, an identifier of the first storage module that can be used to store the first entry, determines the first storage module based on the identifier of the first storage module, and writes the first entry into the first storage module. Optionally, the predetermined algorithm is the hash algorithm. The processing module 30 may calculate a hash value of the first key information, and determine, based on the hash value of the first key information, the identifier of the first storage module that can be used to store the first entry. For example, the processing module 30 may determine the hash value of the first key information as the identifier of the first storage module that can be used to store the first entry. Alternatively, the processing module 30 may determine a remainder of the hash value of the first key information as the identifier of the first storage module that can be used to store the first entry. Alternatively, the processing module 30 may determine values of fixed bits of the hash value of the first key information as the identifier of the first storage module that can be used to store the first entry.

In this embodiment of the present disclosure, the processing module 30 obtains the data table 1 based on a table, and writes entries in the data table 1 into the storage modules 1 to m based on the entries. In another embodiment, the processing module 30 may obtain the data table 1 based on entries, and write the entries in the data table 1 into the storage modules 1 to m based on the entries. That is, each time the processing module 30 obtains one entry in the data table 1, the processing module 30 writes the entry into one of the storage modules 1 to m based on key information of the entry and according to the predetermined algorithm, until all entries in the data table 1 are written into the storage modules. This is not limited in embodiments of the present disclosure.

After storing the data table 1 into the storage modules 1 to m, the processing module 30 may further generate a first mapping relationship based on key information of each entry in the data table 1 and an identifier of a storage module in which each entry in the data table 1 is located. For example, the processing module 30 correspondingly stores the key information of each entry in the data table 1 and the identifier of the storage module in which each entry is located, to obtain the first mapping relationship, where the first mapping relationship includes a mapping relationship between the first key information and the identifier of the first storage module. After storing the data table 1 into the storage modules 1 to m, the processing module 30 may further generate a second mapping relationship based on the key information of each entry in the data table 1 and an offset address of each entry stored in the storage module. For example, the processing module 30 correspondingly stores the key information of each entry in the data table 1 and the offset address of each entry in the storage module, to obtain the second mapping relationship, where the second mapping relationship includes a mapping relationship between the first key information and a first offset address.

In this embodiment of the present disclosure, the processing module 30 may have a plurality of implementations. For example, the processing module 30 includes a switching module and a search module. The search module and the switching module cooperate to implement functions of the processing module 30. Alternatively, the processing module 30 includes a switching module, a search module, and a processor. The switching module, the search module, and the processor cooperate to implement the functions of the processing module 30. When the processing module 30 includes the switching module and the search module, the switching module and the search module are sequentially connected between the cache module 40 and the storage modules 1 to m, or the search module and the switching module are sequentially connected between the cache module 40 and the storage modules 1 to m. When the processing module 30 includes the switching module, the search module, and the processor, the processor, the switching module, and the search module are sequentially connected between the cache module 40 and the storage modules 1 to m, or the processor, the search module, and the switching module are sequentially connected between the cache module 40 and the storage modules 1 to m. The following describes, based on different processing modules 30, the data search apparatus provided in this embodiment of the present disclosure in four implementations.

Figure 6:
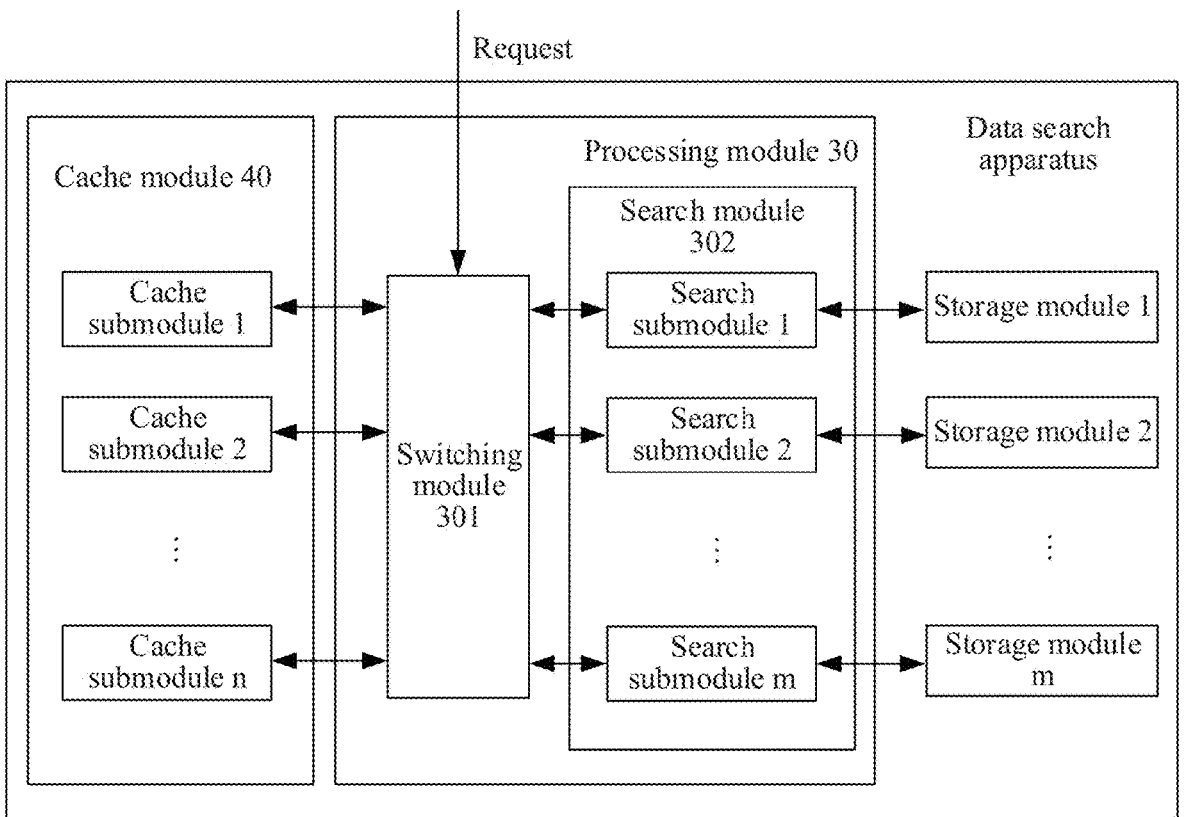
FIG. 6 is a diagram of a structure of still yet another data search apparatus according to an embodiment of the present disclosure.

First implementation: As shown in FIG. 6, the processing module 30 includes a switching module 301 and a search module 302. The switching module 301 and the search module 302 are sequentially connected between the cache module 40 and the storage modules 1 to m. The switching module 301 is configured to determine a storage module that stores an entry in the data table 1. The search module 302 is configured to determine an entry in the data table 1 stored in the storage modules 1 to m. For example, the switching module 301 is configured to determine the first storage module based on the first key information carried in the first search request, and the search module 302 is configured to determine, based on the first key information, the first entry stored in the first storage module.

As shown in FIG. 6, the search module 302 includes a plurality of search submodules (where the first implementation is described using an example in which the plurality of search submodules are search submodules 1 to m), the switching module 301 is separately connected to the search submodules 1 to m and the cache submodules 1 to n, and the search submodules 1 to m are connected to the storage modules 1 to m in a one-to-one correspondence. The search submodules 1 to m are configured to determine the entry in the data table 1 stored in the storage modules 1 to m. For example, a search submodule 1 is configured to determine an entry in the data table 1 stored in a storage module 1, a search submodule 2 is configured to determine an entry in the data table 1 stored in a storage module 2, and so on. For example, after determining the first storage module (for example, the storage module 1) based on the first key information carried in the first search request, the switching module 301 performs transmission of the first key information with a first search submodule (for example, the search submodule 1) connected to the first storage module. The first search submodule is configured to determine, based on the first key information, the first entry stored in the first storage module.

In the first implementation, the switching module 301 may be further configured to: store a hot entry in the data table 1 in the cache module 40, determine whether an entry requested in a search request is stored in the cache module 40, and if the entry requested in the search request is stored in the cache module 40, determine the entry that is requested in the search request and that is stored in the cache module 40. In addition, the switching module 301 may be further configured to cache a search requirement of the search request. For example, after receiving the first search request, the switching module 301 determines, based on the first key information carried in the first search request, whether the first entry is stored in the first cache submodule (for example, the cache submodule 1). If the switching module 301 determines that the first entry is stored in the first cache submodule, the switching module 301 determines the first entry stored in the first cache submodule. If the switching module 301 determines that the first entry is not stored in the first cache submodule, the switching module 301 determines the first storage module based on the first key information. For example, after receiving the second search request, the switching module 301 determines, based on the second key information carried in the second search request, whether the second entry is stored in the second cache submodule (for example, the cache submodule 2). If the switching module 301 determines that the second entry is stored in the second cache submodule, the switching module 301 determines the second entry stored in the second cache submodule. If the switching module 301 determines that the second entry is not stored in the second cache submodule, the switching module 301 determines the first storage module based on the second key information, and caches the search requirement of the second search request in the switching module 301 based on that the storage module requested in the first search request is the same as the storage module requested in the second search request (where the two requested storage modules are the first storage module). The cache submodules 1 to n include the first cache submodule and the second cache submodule. The switching module 301 may further update, in a process of processing the search request, entries cached in the cache submodules 1 to n.

Figure 7:
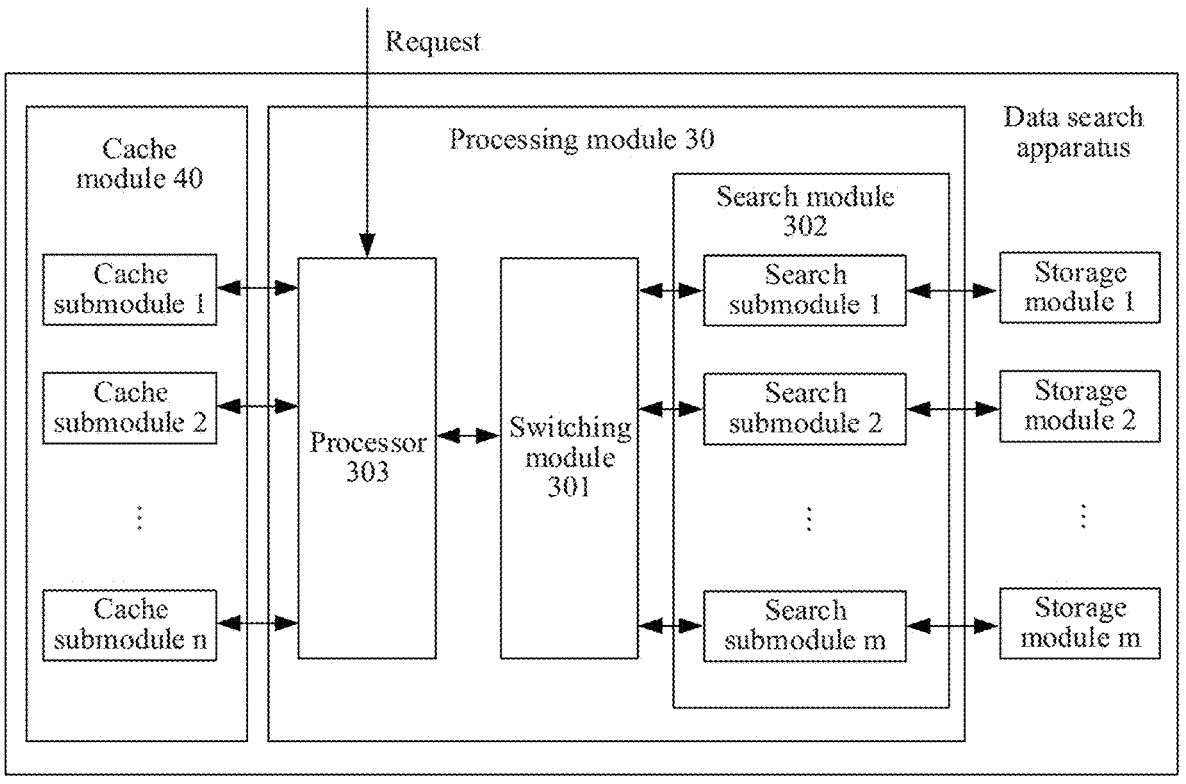
FIG. 7 is a diagram of a structure of still another data search apparatus according to an embodiment of the present disclosure.

Second implementation: As shown in FIG. 7, the processing module 30 includes a switching module 301, a search module 302, and a processor 303. The processor 303, the switching module 301, and the search module 302 are sequentially connected between the cache module 40 and the storage modules 1 to m. The switching module 301 is configured to determine a storage module that stores an entry in the data table 1. The search module 302 is configured to determine an entry in the data table 1 stored in the storage modules 1 to m. For example, the search module 302 includes a plurality of search submodules (where the second implementation is described using an example in which the plurality of search submodules are search submodules 1 to m), the processor 303 is separately connected to the switching module 301 and the cache submodules 1 to n, the switching module 301 is further separately connected to the search submodules 1 to m, and the search submodules 1 to m are connected to the storage modules 1 to m in a one-to-one correspondence. The search submodules 1 to m are configured to determine the entry in the data table 1 stored in the storage modules 1 to m. For example, a search submodule 1 is configured to determine an entry in the data table 1 stored in a storage module 1, a search submodule 2 is configured to determine an entry in the data table 1 stored in a storage module 2, and so on. The switching module 301 may be configured to determine the first storage module (for example, the storage module 1) based on the first key information carried in the first search request, and perform transmission of the first key information with a first search submodule (for example, the search submodule 1) connected to the first storage module. The first search submodule may be configured to determine, based on the first key information, the first entry stored in the first storage module.

In the second implementation, the processor 303 may be configured to: store a hot entry in the data table 1 in the cache module 40, determine whether an entry requested in a search request is stored in the cache module 40, and if the entry requested in the search request is stored in the cache module 40, determine the entry that is requested in the search request and that is stored in the cache module 40. The switching module 301 may be further configured to cache a search requirement of the search request. For example, after receiving the first search request, the processor 303 determines, based on the first key information carried in the first search request, whether the first entry is stored in the first cache submodule (for example, the cache submodule 1). If the processor 303 determines that the first entry is stored in the first cache submodule, the processor 303 determines the first entry stored in the first cache submodule. If the processor 303 determines that the first entry is not stored in the first cache submodule, the processor 303 performs transmission of the first key information with the switching module 301, and the switching module 301 determines the first storage module (for example, the storage module 1) based on the first key information. After receiving the second search request, the processor 303 determines, based on the second key information carried in the second search request, whether the second entry is stored in the second cache submodule (for example, the cache submodule 2). If the processor 303 determines that the second entry is stored in the second cache submodule, the processor 303 determines the second entry stored in the second cache submodule. If the processor 303 determines that the second entry is not stored in the second cache submodule, the processor 303 performs transmission of the second key information with the switching module 301, the switching module 301 determines the first storage module based on the second key information, and the switching module 301 caches the search requirement of the second search request in the switching module 301 based on that the storage module requested in the first search request is the same as the storage module requested in the second search request (where the two requested storage modules are the first storage module). The cache submodules 1 to n include the first cache submodule and the second cache submodule. The processor 303 may further update, in a process of processing the search request, entries cached in the cache submodules 1 to n. This is not limited in embodiments of the present disclosure.

Figure 8:
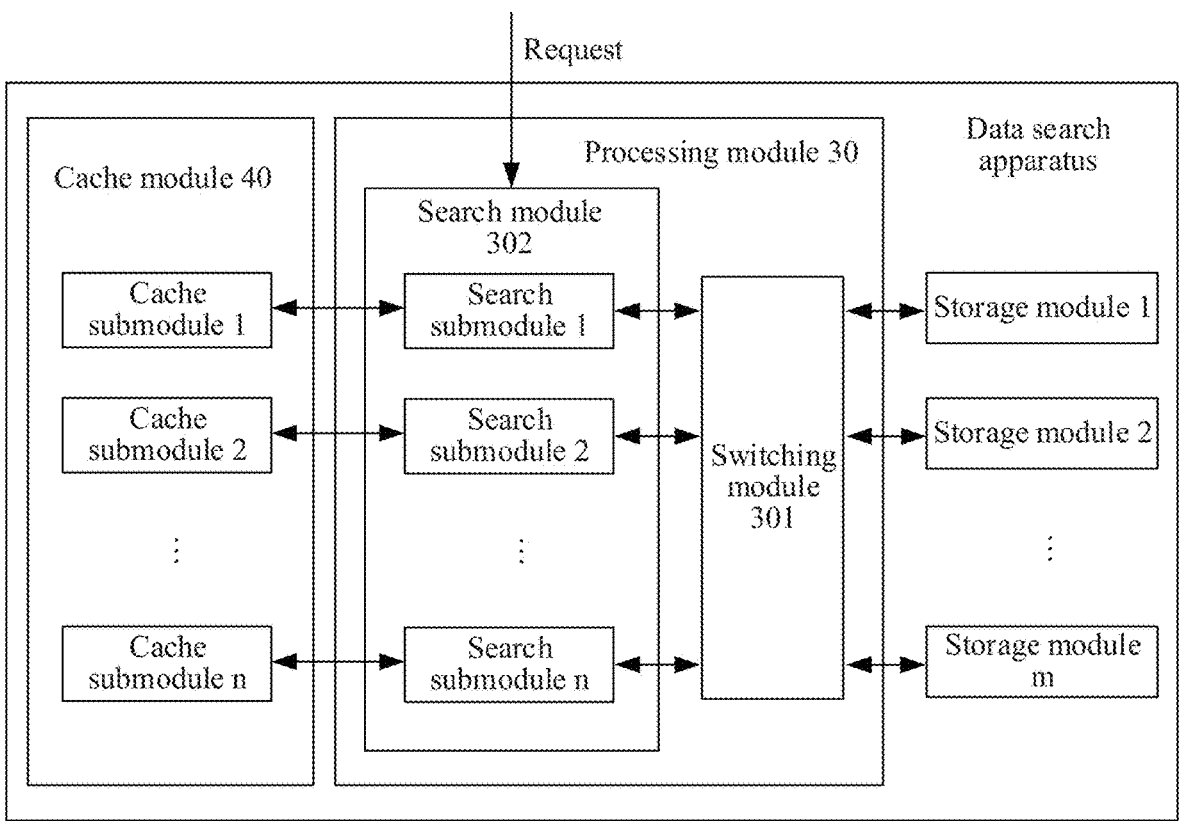
FIG. 8 is a diagram of a structure of still another data search apparatus according to an embodiment of the present disclosure.

Third implementation: As shown in FIG. 8, the processing module 30 includes a switching module 301 and a search module 302. The search module 302 and the switching module 301 are sequentially connected between the cache module 40 and the storage modules 1 to m. The search module 302 is configured to: determine a storage module that stores an entry in the data table 1, and determine, through the switching module 301, an entry in the data table 1 stored in the storage modules 1 to m. For example, the search module 302 is configured to: determine the first storage module based on the first key information, and determine, through the switching module 301 based on the first key information, the first entry stored in the first storage module.

As shown in FIG. 8, the search module 302 includes a plurality of search submodules (where the third implementation is described using an example in which the plurality of search submodules are search submodules 1 to n), the switching module 301 is separately connected to the search submodules 1 to n and the storage modules 1 to m, and the search submodules 1 to n are connected to the cache submodules 1 to n in a one-to-one correspondence. The search submodules 1 to n are configured to determine the storage module that stores the entry in the data table 1, and determine, through the switching module 301, the entry in the data table 1 stored in the storage modules 1 to m. For example, a first search submodule (for example, a search submodule 1) determines the first storage module (for example, the storage module 1) based on the first key information carried in the first search request, and determines, through the switching module 301, the first entry stored in the first storage module. The search submodules 1 to n include the first search submodule. For example, the first search submodule is a search submodule that receives the first search request.

In the third implementation, the search module 302 is further configured to determine whether an entry requested in a search request is stored in the cache module 40, and if the entry requested in the search request is stored in the cache module 40, determine the entry that is requested in the search request and that is stored in the cache module 40. In addition, the switching module 301 may be further configured to cache a search requirement of the search request, or the search module 302 may be configured to cache the search requirement of the search request. For example, when each search submodule receives a plurality of search requests that need to be simultaneously processed by the search submodule and are used to request a same storage module, the search submodule may cache search requirements of the plurality of search requests in the search submodule, or the search submodule may cache the search requirements of the plurality of search requests in the switching module 301. For example, the first search request and the second search request are search requests that need to be simultaneously processed by the first search submodule (for example, the search submodule 1). After receiving the first search request, the first search submodule determines, based on the first key information carried in the first search request, whether the first entry is stored in the first cache submodule (for example, the cache submodule 1). If the first entry is stored in the first cache submodule, the first search submodule determines the first entry stored in the first cache submodule. If the first entry is not stored in the first cache submodule, the first search submodule determines, based on the first key information, the first storage module (for example, the storage module 1) and the first entry stored in the first storage module. In addition, after receiving the second search request, the first search submodule determines, based on the second key information carried in the second search request, whether the second entry is stored in the first cache submodule. If the second entry is stored in the first cache submodule, the first search submodule determines the second entry stored in the first cache submodule. If the second entry is not stored in the first cache submodule, the first search submodule determines the first storage module based on the second key information, and the first search submodule caches the search requirement of the second search request in the first search submodule or the switching module 301 based on that the storage module requested in the first search request is the same as the storage module requested in the second search request (where the two requested storage modules are the first storage module). The search submodules 1 to n include the first search submodule, the cache submodules 1 to n include the first cache submodule, and the search submodules 1 to n may further update, in a process of processing the search request, entries cached in the corresponding cache submodules 1 to n.

Figure 9:
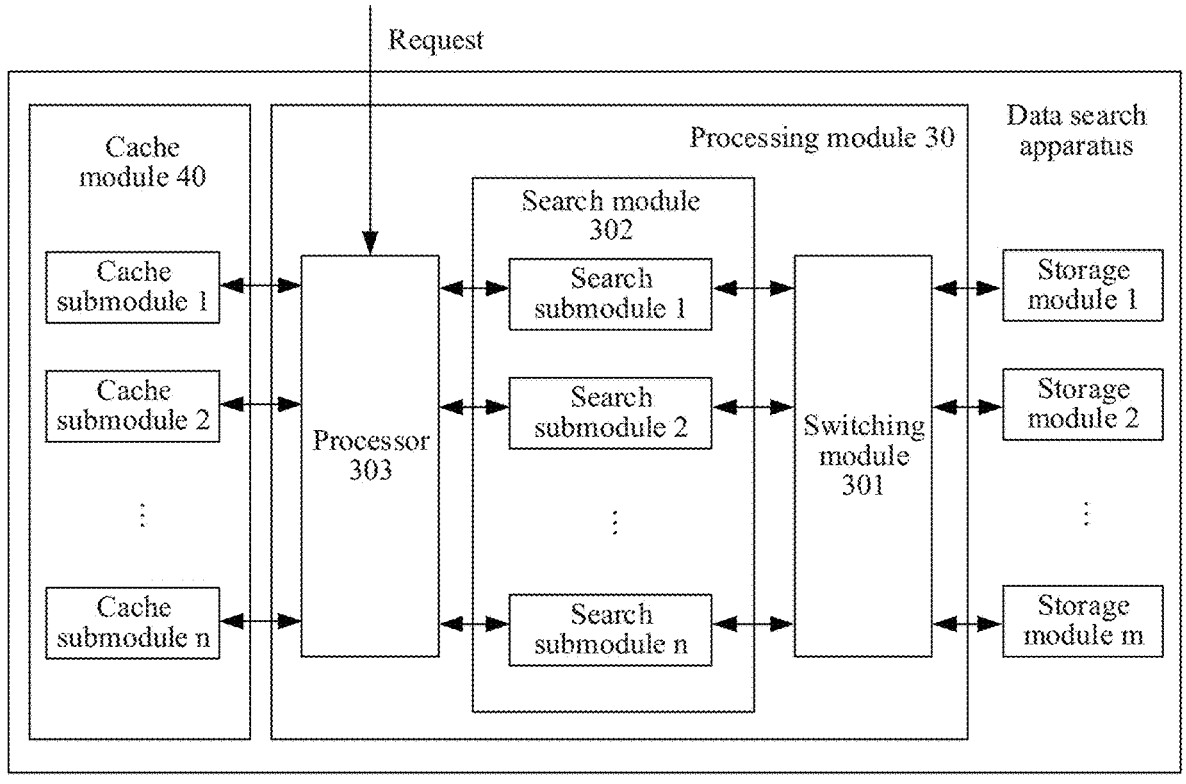
FIG. 9 is a diagram of a structure of still another data search apparatus according to an embodiment of the present disclosure.

Fourth implementation: As shown in FIG. 9, the processing module 30 includes a switching module 301, a search module 302, and a processor 303. The processor 303, the search module 302, and the switching module 301 are sequentially connected between the cache module 40 and the storage modules 1 to m. The search module 302 is configured to determine a storage module that stores an entry in the data table 1, and determine, through the switching module 301, an entry in the data table 1 stored in the storage modules 1 to m. For example, the search module 302 is configured to: determine the first storage module (for example, the storage module 1) based on the first key information carried in the first search request, and determine, through the switching module 301 based on the first key information, the first entry stored in the first storage module.

As shown in FIG. 9, the search module 302 includes a plurality of search submodules (where the fourth implementation is described using an example in which the plurality of search submodules are search submodules 1 to n), the processor 303 is separately connected to the search submodules 1 to n and the cache modules 1 to n, the switching module 301 is separately connected to the search submodules 1 to n and the storage modules 1 to m, and the search submodules 1 to n and the cache submodules 1 to n are in a one-to-one correspondence. The search submodules 1 to n are configured to determine the storage module that stores the entry in the data table 1, and determine, through the switching module 301, the entry in the data table 1 stored in the storage modules 1 to m. For example, a first search submodule (for example, a search submodule 1) determines the first storage module based on the first key information carried in the first search request, and determines, through the switching module 301, the first entry stored in the first storage module. The search submodules 1 to n include the first search submodule.

In the fourth implementation, the processor 303 may be configured to: store a hot entry in the data table 1 in the cache module 40, determine whether the entry requested in the search request is stored in the cache module 40, and if the entry requested in the search request is stored in the cache module 40, determine the entry that is requested in the search request and that is stored in the cache module 40. The switching module 301 may be further configured to cache a search requirement of the search request, or the search module 302 may be configured to cache the search require-ment of the search request. For example, for a plurality of search requests that need to be simultaneously processed by any search submodule and are used to request a same storage module, the search submodule may cache search require-ments of the plurality of search requests in the search submodule, or the search submodule may cache the search requirements of the plurality of search requests in the switching module 301. For example, the first search request and the second search request are search requests that need to be simultaneously processed by the first search submod-ule (for example, the search submodule 1). After receiving the first search request, the processor 303 determines, based on the first key information carried in the first search request, whether the first entry is stored in the first cache submodule (for example, the cache submodule 1). If the first entry is stored in the first cache submodule, the processor 303 determines the first entry stored in the first cache submodule. If the first entry is not stored in the first cache submodule, the processor 303 performs transmission of the first key information with the first search submodule, and the first search submodule determines, based on the first key infor-mation, the first storage module (for example, the storage module 1) and the first entry stored in the first storage module. After receiving the second search request, the processor 303 determines, based on the second key infor-mation carried in the second search request, whether the second entry is stored in the first cache submodule. If the second entry is stored in the first cache submodule, the processor 303 determines the second entry stored in the first cache submodule. If the second entry is not stored in the first cache submodule, the processor 303 performs transmission of the second key information with the first search submod-ule, and the first search submodule determines the first storage module based on the second key information, and caches the search requirement of the second search request in the first search submodule or the switching module 301 based on that the storage module requested in the first search request is the same as the storage module requested in the second search request (where the two requested storage modules are the first storage module). The search submod-ules 1 to n include the first search submodule, and the cache submodules 1 to n include the first cache submodule. The processor 303 may further update, in a process of processing the search request, entries cached in the cache submodules 1 to n. This is not limited in embodiments of the present disclosure.

In this embodiment of the present disclosure, the search submodule may also be referred to as a search engine. In the data search apparatuses shown in FIG. 6 and FIG. 7, existence of the switching module 301 enables an entry stored in any one of the storage modules 1 to m to be requested in any search request received by the data search apparatus, and the data search apparatus can simultaneously process search requests for accessing at least two of the storage modules 1 to m. In the data search apparatuses shown in FIG. 8 and FIG. 9, the switching module 301 provides communication channels between the search sub-modules 1 to n and the storage modules 1 to m, so that any one of the search submodules 1 to n can access any one of the storage modules 1 to m, the storage modules 1 to m can be simultaneously accessed by at least one of the search submodules 1 to n, and the data search apparatus can simultaneously process search requests for accessing at least two of the storage modules 1 to m.

In an optional embodiment, a network device includes an NP chip, where the NP chip includes the data search apparatus. That is, the data search apparatus belongs to the NP chip. Because the plurality of storage modules included in the data search apparatus are configured to store the same data table, and any one of the plurality of storage modules stores a part of entries of the data table, overheads of storage resources of the NP chip are reduced, an area of the NP chip is reduced, and costs of the NP chip are reduced.

In conclusion, according to the data search apparatus provided in this embodiment of the present disclosure, the data search apparatus includes the plurality of storage mod-ules, the plurality of storage modules are configured to store the data table, the any one of the plurality of storage modules stores the part of entries of the data table, and storage addresses of entries stored in at least one of the plurality of storage modules are inconsecutive. Therefore, in most cases, there is a low probability that entries requested in a plurality of search requests processed in parallel by the data search apparatus are located in a same storage module. This helps reduce a probability of a conflict in a process of processing the plurality of search requests in parallel by the data search apparatus. For example, a probability of a conflict in a parallel search process performed by the data search apparatus is reduced, thereby reducing difficulty of parallel data search.

The foregoing describes the data search apparatuses in the present disclosure, and the following describes embodiments of data search methods in the present disclosure.

The data search method in this embodiment of the present disclosure is applicable to the foregoing data search apparatus. The data search apparatus is applied to the network device. The data search apparatus includes the processing module and the plurality of storage modules. The plurality of storage modules are configured to store the data table (for example, the data table 1), the any one of the plurality of storage modules stores the part of entries of the data table 1, any entry in the data table 1 is unique in the plurality of storage modules, and the storage addresses of the entries stored in the at least one of the plurality of storage modules are inconsecutive. For a specific structure of the data search apparatus, refer to the embodiments shown in FIG. 3 to FIG. 9.

Figure 10:
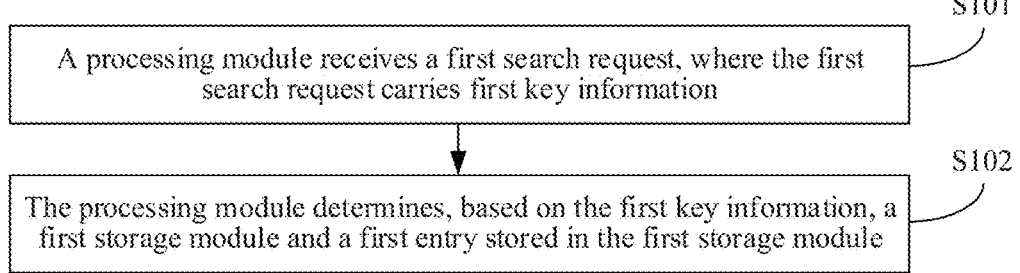
FIG. 10 is a flowchart of a data search method according to an embodiment of the present disclosure.

FIG. 10 is a flowchart of a data search method according to an embodiment of the present disclosure. The data search method includes the following steps S101 and S102.

S101: A processing module receives a first search request, where the first search request carries first key information.

S102: The processing module determines, based on the first key information, a first storage module and a first entry stored in the first storage module.

A plurality of storage modules include the first storage module, a data table 1 includes a first entry, and the first key information may be key information of the first entry. In S102, the processing module may first determine the first storage module based on the first key information, and then determine, based on the first key information, the first entry stored in the first storage module.

Optionally, the processing module maintains a first mapping relationship. The first mapping relationship includes a mapping relationship between the first key information and an identifier of the first storage module. The processing module may determine the first storage module based on the first key information and the first mapping relationship. For example, the first mapping relationship is a mapping table. The processing module searches for the first mapping relationship based on the first key information, to determine the identifier of the first storage module corresponding to the first key information, and then determines the first storage module based on the identifier of the first storage module.

Optionally, that the processing module determines, based on the first key information, a first entry stored in the first storage module includes: The processing module determines a first storage address based on the first key information, where the first storage address indicates a storage location of the first entry in the first storage module. For example, the processing module determines a first offset address based on the first key information, and determines the first storage address based on the first offset address. After determining the first storage address, the processing module may determine, based on the first storage address, the first entry stored in the first storage module. The first storage address may be a physical address.

In an example of the present disclosure, the processing module maintains a second mapping relationship, and the second mapping relationship includes a mapping relationship between the first key information and the first offset address. The processing module may determine the first offset address based on the first key information and the second mapping relationship, and determine the first storage address based on an initial address (where the initial address is a physical address) of the first storage module and the first offset address. For example, the processing module adds the initial address of the first storage module and the first offset address to obtain the first storage address.

In an optional embodiment, the data search apparatus in the present disclosure further includes a cache module, where the cache module is configured to store an entry with access frequency greater than a frequency threshold in the data table 1. Before S102, the processing module may determine, based on the first key information, whether the first entry is stored in the cache module. If the processing module determines that the first entry is stored in the cache module, the processing module determines the first entry stored in the cache module. If the processing module determines that the first entry is not stored in the cache module, the processing module performs S102. For example, the first search request is a read request. If the first entry is stored in the cache module, the processing module directly reads the first entry stored in the cache module.

In this embodiment of the present disclosure, the processing module may include a switching module and a search module. Functions of the switching module and the search module vary with a connection relationship of the switching module, the search module, and the plurality of storage modules. For example, as shown in FIG. 6 and FIG. 7, the search module is connected between the switching module and the storage modules 1 to m, the switching module may determine the first storage module based on the first key information, and the search module may determine, based on the first key information, the first entry stored in the first storage module. For example, after determining the first storage module, the switching module performs transmission of the first key information with the first search submodule connected to the first storage module, and the first search submodule determines, based on the first key information, the first entry stored in the first storage module. For example, as shown in FIG. 8 and FIG. 9, the switching module is connected between the search module and the storage modules 1 to m, and the search module may determine, based on the first key information, the first storage module and the first entry stored in the first storage module. For the data search apparatuses shown in FIG. 8 and FIG. 9, the switching module may perform transparent transmission of information between the search module and the storage modules 1 to m, and a function of the switching module is to provide the communication channels between the search module and the storage modules 1 to m.

In this embodiment of the present disclosure, the processing module may further include a processor. For the data search apparatus shown in FIG. 6, the switching module may determine, based on the first key information carried in the first search request, whether the first entry is stored in the cache module. If the first entry is stored in the cache module, the switching module determines the first entry stored in the cache module. For example, the switching module determines, based on the first key information, whether the first entry is stored in the first cache submodule. If the switching module determines that the first entry is stored in the first cache submodule, the switching module determines the first entry stored in the first cache submodule. If the switching module determines that the first entry is not stored in the first cache submodule, the switching module determines the first storage module based on the first key information. For the data search apparatus shown in FIG. 7, the processor may determine, based on the first key information carried in the first search request, whether the first entry is stored in the cache module. If the first entry is stored in the cache module, the processor determines the first entry stored in the cache module. For example, the processor determines, based on the first key information, whether the first entry is stored in the first cache submodule. If the processor determines that the first entry is stored in the first cache submodule, the processor determines the first entry stored in the first cache submodule. If the processor determines that the first entry is not stored in the first cache submodule, the processor performs transmission of the first key information with the switching module, and the switching module determines the first storage module based on the first key information. For the data search apparatus shown in FIG. 8, the search module may determine, based on the first key information carried in the first search request, whether the first entry is stored in the cache module. If the first entry is stored in the cache module, the search module determines the first entry stored in the cache module. For example, the search module (for example, the first search submodule) determines, based on the first key information, whether the first entry is stored in the first cache submodule. If the search module determines that the first entry is stored in the first cache submodule, the search module determines the first entry stored in the first cache submodule. If the search module determines that the first entry is not stored in the first cache submodule, the search module determines, based on the first key information, the first storage module and the first entry stored in the first storage module. For the data search apparatus shown in FIG. 9, the processor may determine, based on the first key information carried in the first search request, whether the first entry is stored in the cache module. If the first entry is stored in the cache module, the processor determines the first entry stored in the cache module. For example, the processor determines, based on the first key information, whether the first entry is stored in the first cache submodule. If the processor determines that the first entry is stored in the first cache submodule, the processor determines the first entry stored in the first cache submodule. If the processor determines that the first entry is not stored in the first cache submodule, the processor performs transmission of the first key information with the search module (for example, the first search submodule), and the search module determines, based on the first key information, the first storage module and the first entry stored in the first storage module.

In an optional embodiment, the processing module needs to simultaneously process a plurality of search requests. If the processing module determines that storage modules requested in the plurality of search requests are the same, the processing module may cache search requirements of the plurality of search requests. Then, the processing module may schedule and process the plurality of search requests according to a scheduling algorithm. Because only one search operation (for example, a read/write operation) is usually allowed to be performed on a same storage module at a same moment or in a same cycle, the processing module caches the search requirements of the plurality of search requests, so that a conflict between processing processes of the plurality of search requests can be avoided.

For example, FIG. 11 is a flowchart of another data search method according to an embodiment of the present disclosure. As shown in FIG. 11, based on FIG. 10, the data search method further includes the following steps S103 to S105.

S103: A processing module receives a second search request, where the second search request carries second key information, and a first search request and the second search request are search requests that need to be simultaneously processed by the processing module.

The first search request and the second search request may be search requests received by the processing module at a same moment. For example, the first search request and the second search request are search requests received by the processing module at the same moment through different interfaces. Alternatively, the first search request and the second search request may be search requests received by the processing module in a same cycle.

S104: The processing module determines a first storage module based on the second key information.

For example, the processing module determines the first storage module based on the second key information and a first mapping relationship.

Optionally, an entry requested in the second search request is a second entry in a data table 1. Before S104, the processing module may determine, based on the second key information, whether the second entry is stored in a cache module. If the processing module determines that the second entry is stored in the cache module, the processing module determines the second entry stored in the cache module. If the processing module determines that the second entry is not stored in the cache module, the processing module performs S104.

S105: The processing module caches a search requirement of the second search request based on that a storage module requested in the first search request is the same as a storage module requested in the second search request.

After the processing module determines the first storage module based on the second key information, the processing module determines that the storage module requested in the second search request is the first storage module. Because the storage module requested in the first search request is also the first storage module, the processing module determines that the storage module requested in the first search request is the same as the storage module requested in the second search request. Because only one search operation is allowed to be performed on a same storage module at a same moment or in a same cycle, to avoid a conflict between a processing process of the first search request and a processing process of the second search request, the processing module caches the search requirement of the second search request.

Optionally, for the data search apparatuses shown in FIG. 6 and FIG. 7, the switching module may perform S104 and S105. For the data search apparatuses shown in FIG. 8 and FIG. 9, the search module may perform S104 and S105.

In an optional embodiment, before searching the plurality of storage modules for an entry of the data table 1 based on a search request, the processing module may first store the data table 1 in the plurality of storage modules. In an example, FIG. 12 is a flowchart of a method for storing a data table in a plurality of storage modules by a processing module according to an embodiment of the present disclosure. As shown in FIG. 12, the method includes the following steps S201 to S204.

S201: A processing module receives a write request.

S202: The processing module obtains the data table based on the write request.

Optionally, the write request carries indication information of the data table, and the processing module obtains the data table based on the indication information of the data table. The indication information of the data table may be an identifier, a name, a storage location, or the like of the data table.

S203: The processing module determines first key information of a first entry in the data table.

Optionally, the first entry includes the first key information, and the processing module determines the first key information included in the first entry. For example, the data table is a packet forwarding table, an entry in the packet forwarding table is a forwarding entry, the forwarding entry may include a packet address and a port identifier, and key information of the forwarding entry may be the packet address included in the forwarding entry.

Alternatively, the processing module generates the first key information based on the first entry. For example, the first key information is a hash value of the first entry, and the processing module generates the hash value of the first entry.

S204: The processing module writes the first entry into a first storage module based on the first key information and according to a predetermined algorithm.

Optionally, the processing module determines, based on the first key information and according to the predetermined algorithm, an identifier of the first storage module that can be used to store the first entry, determines the first storage module based on the identifier of the first storage module, and writes the first entry into the first storage module. The predetermined algorithm is used to make storage addresses of entries written into at least one of the plurality of storage modules inconsecutive.

The predetermined algorithm includes one of a hash algorithm and a random algorithm. For example, the predetermined algorithm is the hash algorithm. The processing module may calculate a hash value of the first key information, and determine, based on the hash value of the first key information, the identifier of the first storage module that can be used to store the first entry. For example, the processing module determines the hash value of the first key information as the identifier of the first storage module that can be used to store the first entry. Alternatively, the processing module may determine a remainder of the hash value of the first key information as the identifier of the first storage module that can be used to store the first entry. Alternatively, the processing module may determine values of fixed bits of the hash value of the first key information as the identifier of the first storage module that can be used to store the first entry.

S203 and S204 are described using an example in which the processing module stores the first entry in the data table. For each entry in the data table, the processing module may write the entry into a storage module according to the method provided in S203 and S204. After storing the data table into the plurality of storage modules, the processing module may further generate a first mapping relationship based on key information of each entry in the data table and an identifier of a storage module in which each entry in the data table is located, where the first mapping relationship includes a mapping relationship between the first key information and the identifier of the first storage module. In addition, the processing module may further generate a second mapping relationship based on the key information of each entry in the data table and an offset address of each entry stored in the storage module, where the second mapping relationship includes the first key information and a first offset address (an offset address of the first entry in the first storage module).

Content of the data search method in the present disclosure has been described in detail in the foregoing embodiments of the data search apparatus, and therefore is not described in detail in this embodiment of the data search method. For additional details of this embodiment of the data search method, refer to the foregoing embodiments of the data search apparatus.

An embodiment of the present disclosure further provides a network device. The network device includes the data search apparatus provided in the foregoing embodiments. The network device may be any network device in a network. For example, according to a device type, the network device may be a switch, a router, or the like. According to a device deployment location, the network device may be an edge network device, a core network device, or a network device in a data center. For example, the edge network device may be a provider edge (PE) device, and the core network device may be a provider (P) device.

Figure 13:
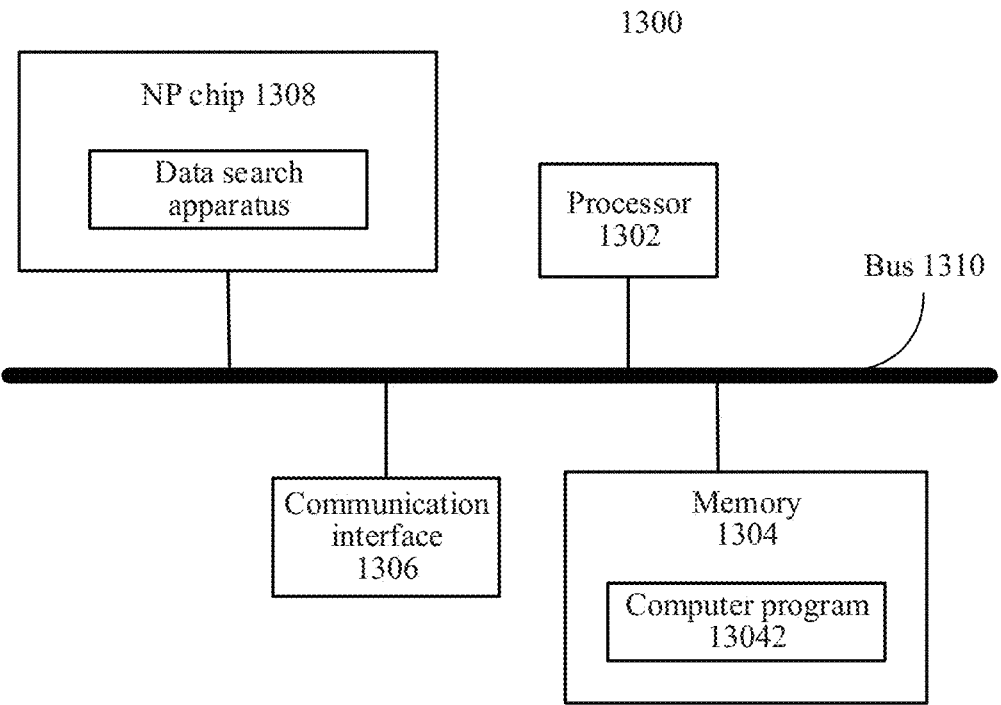
FIG. 13 is a diagram of a structure of a network device according to an embodiment of the present disclosure.

For example, FIG. 13 is a diagram of a structure of a network device 1300 according to an embodiment of the present disclosure. The network device 1300 includes a processor 1302, a memory 1304, a communication interface 1306, a data search apparatus, and a bus 1310. For example, the network device 1300 includes an NP chip 1308, where the NP chip 1308 includes the data search apparatus. The processor 1302, the memory 1304, the communication interface 1306, and the NP chip 1308 are communicatively connected to each other through the bus 1310. A connection manner between the processor 1302, the memory 1304, the communication interface 1306, and the NP chip 1308 shown in FIG. 13 is merely an example. In an implementation process, alternatively, the processor 1302, the memory 1304, the communication interface 1306, and the NP chip 1308 may be communicatively connected to each other in another connection manner other than using the bus 1310.

The memory 1304 is configured to store a computer program 13042. The computer program 13042 may include instructions and data. The memory 1304 may be various types of storage media, for example, a random-access memory (RAM), a read-only memory (ROM), a non-volatile RAM (NVRAM), a programmable ROM (PROM), an erasable PROM (EPROM), an electrically erasable PROM (EEPROM), a flash memory, an optical memory, a register, or the like.

The processor 1302 may be a general-purpose processor. The general-purpose processor may be a processor that reads and executes a computer program (for example, the computer program 13042) stored in a memory (for example, the memory 1304) to perform a specific step and/or operation. In a process of performing the step and/or operation, the general-purpose processor may use data stored in the memory (for example, the memory 1304). The general-purpose processor may be, for example, but is not limited to, a central processing unit (CPU). In addition, the processor 1302 may alternatively be a dedicated processor. The dedicated processor may be a processor specially designed to perform a specific step and/or operation. The dedicated processor may be, for example, but is not limited to, an application-specific integrated circuit (ASIC), a field-programmable gate array (FPGA), a network processor (NP), or generic array logic (GAL), or the like. In addition, the processor 1302 may alternatively be a combination of a plurality of processors, for example, a multi-core processor.

The communication interface 1306 may include interfaces such as an input/output (I/O) interface, a physical interface, and a logical interface configured to interconnect components inside the network device 1300, and an interface configured to interconnect the network device 1300 and another device (for example, a network device). The physical interface may be a gigabit Ethernet (GE) interface, and may be configured to interconnect the network device 1300 and another device. The logical interface is an interface inside the network device 1300, and the logical interface may be configured to interconnect components inside the network device 1300. It is easy to understand that the communication interface 1306 may be used by the network device 1300 to communicate with another device. For example, a packet is sent and received between the network device 1300 and the another device through the communication interface 1306.

The NP chip 1308 may include a programmable logic circuit and/or program instructions. For a structure of the data search apparatus, refer to the embodiments shown in FIG. 3 to FIG. 9. The bus 1310 may be any type of communication bus, for example, a system bus configured to interconnect the processor 1302, the memory 1304, the communication interface 1306, and the NP chip 1308.

Interconnection between the NP chip 1308 and any component in the processor 1302, the memory 1304, and the communication interface 1306 may specifically refer to interconnection between the component and a component in the NP chip 1308. The network device 1300 shown in FIG. 13 is merely an example. In an implementation process, the network device 1300 may further include other components, which are not enumerated one by one in this specification.

All or some of the foregoing embodiments may be implemented using software, hardware, firmware, or any combination thereof. When the software is used for implementation, all or some of the embodiments may be implemented in a form of a computer program product. The computer program product includes one or more computer instructions. When the computer program instructions are loaded and executed on a computer, the procedures or functions according to embodiments of the present disclosure are all or partially generated. The computer may be a general-purpose computer, a computer network, or another programmable apparatus. The computer instructions may be stored in a computer-readable storage medium, or transmitted from one computer-readable storage medium to another computer-readable storage medium. For example, the computer instructions may be transmitted from one website, computer, server, or data center to another website, computer, server, or data center in a wired (for example, a coaxial cable, an optical fiber, or a digital subscriber line) or wireless (for example, infrared, radio, or microwave) manner. The computer-readable storage medium may be any usable medium accessible by the computer, or a data storage apparatus, such as a server or a data center, integrating one or more usable media. The usable medium may be a magnetic medium (for example, a floppy disk, a hard disk, or a magnetic tape), an optical medium, a semiconductor medium (for example, a solid-state drive), or the like.

It should be understood that the term "at least one" in the present disclosure means one or more, and the term "a plurality of" means two or more. In the present disclosure, unless otherwise specified, the symbol "/" means or. For example, A/B represents A or B. The term "and/or" in the present disclosure describes only an association relationship between associated objects and represents that three relationships may exist. For example, A and/or B may represent the following three cases: Only A exists, both A and B exist, and only B exists. In addition, for ease of clear description, in the present disclosure, terms such as "first", "second", and "third" are used for distinguishing between same items or similar items having basically same functions and effects. The terms such as "first", "second", and "third" do not limit a quantity and an execution sequence.

Different types of embodiments such as the method embodiments and the apparatus embodiments provided in embodiments of the present disclosure may be cross-referenced. A sequence of the steps of the method embodiment provided in embodiments of the present disclosure can be properly adjusted, and the steps can be correspondingly added or deleted based on a situation. Any modified method that can be easily figured out by a person skilled in the art without departing from a technical scope disclosed in the present disclosure shall fall within the protection scope of the present disclosure, and therefore details are not described again.

In the corresponding embodiments provided in the present disclosure, the disclosed apparatus and the like may be implemented in other composition manners. For example, the described apparatus embodiment is merely an example. For example, division into the units is merely logical function division and may be another division manner during actual implementation. For example, a plurality of units or components are combined or integrated into another system, or some features may be ignored or not performed. The units described as separate parts may or may not be physically separate, and parts described as units may or may not be physical units, and may be located in one position or may be located in different positions. Some or all of the units may be selected based on actual needs to achieve the objectives of the solutions of embodiments.

The foregoing descriptions are merely example implementations of the present disclosure, but are not intended to limit the protection scope of the present disclosure. Any equivalent modification or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A data search apparatus comprising:
a plurality of storage modules configured to store a data table comprising entries, wherein each of the storage modules is configured to store at least one of the entries, wherein each of the entries is unique in the storage modules, and wherein storage addresses of the entries stored in at least one storage module in the plurality of storage modules are inconsecutive; and
a processor coupled to the plurality of storage modules and configured to:
receive a first search request comprising first key information;
receive a second search request comprising second key information, wherein the first search request and the second search request are to be simultaneously processed by the processor;
determine, based on the first key information, a first storage module in the plurality of storage modules and a first entry of the entries stored in the first storage module;
determine the first storage module based on the second key information; and cache a search requirement of the second search request when the first search request and the second search request both request a same storage module of the plurality of storage modules.

2. The data search apparatus of claim 1, wherein the processor is further configured to determine the first storage module based on a first mapping relationship between the first key information and an identifier of the first storage module.

3. The data search apparatus of claim 1, wherein the processor is further configured to determine, based on the first key information, a first storage address indicating a storage location of the first entry.

4. The data search apparatus of claim 2, wherein the processor is further configured to:
receive a write request;
obtain the data table based on the write request;
determine the first key information in the data table; and
write the first entry into the first storage module based on the first key information and according to a predetermined algorithm configured to make storage addresses of the entries inconsecutive.

5. The data search apparatus of claim 4, wherein the predetermined algorithm comprises a hash algorithm or a random algorithm.

6. The data search apparatus of claim 4, wherein the processor is further configured to generate the first mapping relationship.

7. The data search apparatus of claim 1, further comprising a cache module, coupled to the processor, and configured to store, in the data table, the entries having an access frequency greater than a frequency threshold, wherein the processor is further configured to determine, based on the first key information, that the first entry is not stored in the cache module.

8. The data search apparatus of claim 1, wherein the processor comprises:
a plurality of search submodules coupled to the plurality of storage modules in a one-to-one correspondence and configured to determine at least one entry of the entries; and
a switching module coupled to the plurality of search submodules and configured to determine the first storage module and the first entry.

9. The data search apparatus of claim 8, wherein the switching module is further configured to determine the first storage module based on the first key information, and wherein a first search submodule in the plurality of search submodules is configured to determine, based on the first key information, the first entry.

10. The data search apparatus of claim 8, further comprising a cache module comprising a plurality of cache submodules, wherein the plurality of cache submodules is coupled to the switching module and configured to store the entries having an access frequency greater than a frequency threshold, and wherein the switching module is further configured to determine, based on the first key information, that the first entry is not stored in the plurality of cache submodules.

11. The data search apparatus of claim 10, wherein a first quantity of the plurality of storage modules is greater than a second quantity of the plurality of cache submodules.

12. The data search apparatus of claim 1, wherein the processor comprises:
a switching module coupled to the plurality of storage modules; and a search module coupled to the switching module and configured to:
determine the first storage module that stores the first entry; and
determine, through the switching module, the first entry.

13. The data search apparatus of claim 12, wherein the search module is further configured to:
determine the first storage module based on the first key information; and
determine, through the switching module based on the first key information, the first entry.

14. The data search apparatus of claim 12, further comprising a cache module comprising a plurality of cache submodules, wherein the plurality of cache submodules is coupled to the search module and configured to store the entries having an access frequency greater than a frequency threshold, and wherein the search module is further configured to determine, based on the first key information, that the first entry is not stored in a first cache submodule, wherein the plurality of cache submodules comprise the first cache submodule.

15. The data search apparatus of claim 14, wherein the search module comprises a plurality of search submodules, wherein the plurality of search submodules and the plurality of cache submodules are in a one-to-one correspondence, and wherein a first search submodule in the plurality of search submodules is configured to:
determine, based on the first key information, that the first entry is not stored in the first cache submodule; and
determine, based on the first key information, the first storage module and the first entry.

16. The data search apparatus of claim 1, further comprising a network processor (NP) chip configured to implement the data search apparatus.

17. The data search apparatus of claim 1, wherein the data table comprises a packet forwarding table.

18. A method, implemented by a data search apparatus, the method comprising:
storing, by a plurality of storage modules in the data search apparatus, a data table comprising entries so that each of the plurality of storage modules stores at least one of the entries and so that storage addresses of the entries stored in at least one storage module in the plurality of storage modules are inconsecutive, wherein each of the entries is unique in the plurality of storage modules;
receiving a first search request comprising first key information;
receiving a second search request comprising second key information, wherein the first search request and the second search request are to be simultaneously processed;
determining, based on the first key information, a first storage module in the plurality of storage modules and a first entry in the entries;
determining, based on the second key information, that the second search request targets the first storage module; and
caching a search requirement of the second search request when the first search request and the second search request both target the first storage module.

19. The method of claim 18, wherein determining the first storage module comprises determining the first storage module based on the first key information and a first mapping relationship between the first key information and an identifier of the first storage module.

20. The method of claim 18, wherein determining the first entry comprises determining, based on the first key information, a first storage address indicating a storage location of the first entry.

21. The method of claim 18, further comprising:

receiving a write request;

obtaining the data table based on the write request;

determining the first key information in the data table; and writing the first entry into the first storage module based on the first key information and a predetermined algorithm, wherein the predetermined algorithm is configured to make storage addresses inconsecutive.

22. The method of claim 21, wherein the predetermined algorithm comprises a hash algorithm or a random algorithm.

23. The method of claim 21, further comprising generating a first mapping relationship between the first key information and an identifier of the first storage module.

24. The method of claim 18, wherein determining, based on the first key information, the first storage module and the first entry stored in the first storage module comprises determining that the first entry is not stored in a cache module of the data search apparatus, wherein the cache module is configured to store an entry with an access frequency greater than a frequency threshold.

25. The method of claim 18, wherein determining, based on the first key information, the first storage module and the first entry comprises:

determining, by a switching module of the data search apparatus, the first storage module based on the first key information; and determining, by a first search submodule and based on the first key information, the first entry.

26. The method of claim 25, wherein determining, by the switching module, the first storage module based on the first key information comprises determining, by the switching module, that the first entry is not stored in a first cache submodule of a plurality of cache submodules.

27. The method of claim 18, wherein determining, based on the first key information, the first storage module and the first entry stored comprises:

determining, by a search module of the data search apparatus and based on the first key information, the first storage module; and determining, by the search module based on the first key information and through a switching module coupled to the search module and connected to the plurality of storage modules, the first entry.

* * * * *